US009503570B2

(12) United States Patent
Aggarwal et al.

(10) Patent No.: US 9,503,570 B2
(45) Date of Patent: *Nov. 22, 2016

(54) ENHANCED DATA CAPTURE, ANALYSIS, AND REPORTING FOR UNIFIED COMMUNICATIONS

(71) Applicant: Unify Square, Inc., Bellevue, WA (US)

(72) Inventors: Sudhanshu Aggarwal, Bellevue, WA (US); Arun Raghavan, Seattle, WA (US); Robert Osborne, Redmond, WA (US); Alan Shen, Seattle, WA (US); Edward Melomed, Redmond, WA (US)

(73) Assignee: Unify Square, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/721,813

(22) Filed: May 26, 2015

(65) Prior Publication Data

US 2015/0373186 A1 Dec. 24, 2015

Related U.S. Application Data

(63) Continuation of application No. 14/178,209, filed on Feb. 11, 2014, now Pat. No. 9,071,677.

(60) Provisional application No. 61/763,919, filed on Feb. 12, 2013.

(51) Int. Cl.
*H04M 1/24* (2006.01)
*H04M 3/08* (2006.01)
(Continued)

(52) U.S. Cl.
CPC .......... *H04M 3/2227* (2013.01); *G06Q 10/00* (2013.01); *G06Q 30/0203* (2013.01);
(Continued)

(58) Field of Classification Search
CPC ............ H04M 3/2227; H04M 3/2206; H04L 29/06414; H04L 29/06523; H04L 29/0899; H04L 41/5009; H04L 43/045; H04L 43/0852; H04L 43/062; H04L 43/16; H04L 51/36; H04L 67/1002; H04L 43/50; H04L 67/22; G06Q 30/0203; G06Q 10/00
USPC ....... 379/1.01, 32.01, 32.05, 112.01, 112.04, 379/133, 134, 9.04
See application file for complete search history.

(56) References Cited

U.S. PATENT DOCUMENTS 6,078,953 A   6/2000   Vaid et al.
6,370,572 B1  4/2002   Lindskog
(Continued)

FOREIGN PATENT DOCUMENTS

WO   01/33831 A2   5/2001

OTHER PUBLICATIONS

Calev, J., "Lync Server Topologies—on Sites Pools and Services," Joe Calev's WebLog, Sep. 16, 2010, <http://blogs.msdn.com/b/jcalev/archive/2010/09/16/lync-server-topologies-on-sites-pools-and-services.aspx> [retrieved Feb. 11, 2014], 2 pages.
(Continued)

*Primary Examiner* — Binh Tieu
(74) *Attorney, Agent, or Firm* — Christensen O'Connor Johnson Kindness PLLC

(57) ABSTRACT

The present disclosure includes descriptions of various aspects of unified communication (UC) systems, including UC management and analysis systems and related tools and techniques. Described systems, tools, and techniques are adapted for enhanced UC data capture, analysis, and reporting; enhanced UC monitoring services; and a user survey service that can be used for conducting user surveys related to UC services. Embodiments disclosed herein include computer systems and methods that can be used for analyzing service level objectives for call quality, classifying calls into distinct categories, and real-time user notification of call quality and reliability issues.

24 Claims, 18 Drawing Sheets

(51) Int. Cl.

| | | |
|---|---|---|
| *H04M 3/22* | (2006.01) | |
| *H04L 12/58* | (2006.01) | |
| *G06Q 30/02* | (2012.01) | |
| *H04L 12/26* | (2006.01) | |
| *G06Q 10/00* | (2012.01) | |
| *H04L 12/24* | (2006.01) | |
| *H04M 15/00* | (2006.01) | |
| *H04W 68/00* | (2009.01) | |
| *H04L 29/08* | (2006.01) | |

(52) U.S. Cl.
CPC ......... *H04L 41/5038* (2013.01); *H04L 43/50* (2013.01); *H04L 51/36* (2013.01); *H04L 67/22* (2013.01); *H04M 3/2236* (2013.01); *H04M 15/58* (2013.01); *H04W 68/005* (2013.01); *H04L 67/1002* (2013.01)

(56) References Cited

U.S. PATENT DOCUMENTS

| | | | |
|---|---|---|---|
| 6,594,277 B1 * | 7/2003 | Chiang | H04L 12/5695 370/230 |
| 6,748,433 B1 | 6/2004 | Yaakov | |
| 6,993,494 B1 | 1/2006 | Boushy | |
| 7,212,988 B1 | 5/2007 | Feldten | |
| 7,500,143 B2 | 3/2009 | Buia | |
| 7,974,212 B2 | 7/2011 | Leung | |
| 8,095,665 B1 | 1/2012 | Bau | |
| 8,121,049 B2 | 2/2012 | Lidstrom | |
| 8,165,109 B2 | 4/2012 | King | |
| 8,472,323 B2 | 6/2013 | Kallio | |
| 8,503,318 B2 | 8/2013 | Leung | |
| 9,118,751 B2 * | 8/2015 | Kolbegger | G10L 25/93 |
| 2003/0112933 A1 | 6/2003 | Snelgrove | |
| 2003/0149919 A1 | 8/2003 | Greenwald | |
| 2004/0019688 A1 | 1/2004 | Nickerson | |
| 2005/0064874 A1 | 3/2005 | Beacken | |
| 2005/0141493 A1 | 6/2005 | Hardy | |
| 2006/0111092 A1 | 5/2006 | Harris | |
| 2006/0240803 A1 | 10/2006 | Valeriano | |
| 2006/0250955 A1 | 11/2006 | Kallio | |
| 2006/0277550 A1 | 12/2006 | Williams et al. | |
| 2006/0291641 A1 | 12/2006 | Barclay | |
| 2007/0233865 A1 | 10/2007 | Garbow et al. | |
| 2007/0286351 A1 | 12/2007 | Ethier | |
| 2008/0063149 A1 | 3/2008 | West et al. | |
| 2009/0201824 A1 | 8/2009 | Leung | |
| 2009/0225670 A1 | 9/2009 | Leung et al. | |
| 2009/0237240 A1 | 9/2009 | Leung | |
| 2009/0245115 A1 | 10/2009 | Krishnaswamy et al. | |
| 2010/0070345 A1 | 3/2010 | Abelow | |
| 2010/0324971 A1 | 12/2010 | Morsberger | |
| 2011/0009707 A1 | 1/2011 | Kaundinya | |
| 2011/0019570 A1 | 1/2011 | Leung et al. | |
| 2011/0137696 A1 | 6/2011 | Meyer | |
| 2011/0137808 A1 | 6/2011 | Meyer | |
| 2011/0254961 A1 | 10/2011 | Putnam et al. | |
| 2012/0151009 A1 | 6/2012 | Bouazizi et al. | |
| 2013/0094371 A1 * | 4/2013 | Vallath | H04W 76/027 370/252 |
| 2013/0132854 A1 * | 5/2013 | Raleigh | G06F 3/0482 715/738 |
| 2013/0148531 A1 | 6/2013 | Moisan | |
| 2013/0219053 A1 | 8/2013 | Quade et al. | |
| 2013/0250786 A1 | 9/2013 | Balasaygun | |
| 2013/0279325 A1 | 10/2013 | Dunne et al. | |
| 2014/0064137 A1 * | 3/2014 | El-Hennawey | H04M 3/2236 370/253 |
| 2014/0310564 A1 | 10/2014 | Mallige et al. | |
| 2015/0138994 A1 | 5/2015 | Dadheech et al. | |

OTHER PUBLICATIONS

"Cisco Prime Network Analysis Module Software 5.1 User Guide," Text Part No. OL-24410-01, Cisco Systems, Inc., San Jose, Calif., Apr. 2011, Table of Contents, pp. iii-x.

"Cisco Prime Network Analysis Module Software 5.1 User Guide," Text Part No. OL-24410-01, Cisco Systems, Inc., San Jose, Calif., Apr. 2011, Chap. 2, "Setting Up the Cisco NAM," pp. 2-1-2-88.

"Cisco Prime Network Analysis Module Software 5.1 User Guide," Text Part No. OL-24410-01, Cisco Systems, Inc., San Jose, Calif., Apr. 2011, Chap. 3, "Monitoring and Analysis," pp. 3-1-3-42.

"Cisco Prime Network Analysis Module Software 5.1 User Guide," Text Part No. OL-24410-01, Cisco Systems, Inc., San Jose, Calif., Apr. 2011, Chap. 6, "NAM Deployment," pp. 6-1-6-26.

"PowerView 3.0 Is a Scalable and Comprehensive Microsoft Lync Server 2010 Enterprise Reporting Solution for Driving Usage and Adoption, Optimizing Infrastructure Investments, Implementing Departmental Billing, and Tracking Return on Investment," Partner Solution Brief (Partner: Unify$^2$), Case Study Summary, Microsoft, Oct. 2010, 2 pages.

"PowerView by Unify Square, Inc.," Office 365 Marketplace App Overview, © 2014 Microsoft Corporation, Redmond, Wash., <http://lynconline.pinpoint.microsoft .com/en-au/applications/powerview-12884915178> [retrieved Feb. 6, 2014], 3 pages.

Rasmussen, J.T., "What Is the Basis for Classifying a Call as Poor in Lync 2013 QoE?" Jens Trier Rasmussen TechNetBlogs, Sep. 20, 2013, <http://blogs.technet.com/b/jenstr/archive/2013/09/20/what-is-the-basis-for-classifying-a-call-as-poor-in-lync-2013-qoe.aspx> [retrieved Feb. 6, 2014], 2 pages.

"Supported Lync Server 2013 Topologies," © 2014 Microsoft, Redmond, Wash., Jan. 14, 2014, <http://technet.microsoft.com/en-us/library/gg425833(d=printer).aspx> [retrieved Feb. 11, 2014], 5 pages.

Invitation to Pay Additional Fees and, Where Applicable, Protest Fee mailed May 16, 2014, issued in corresponding International Application No. PCT/US2014/016124, filed Feb. 12, 2014, 3 pages.

International Search Report and Written Opinion mailed Mar. 18, 2015, issued in corresponding International Application No. PCT/US2014/016124, filed Feb. 12, 2014, 17 pages.

Office Action mailed Oct. 7, 2015, from U.S. Appl. No. 14/178,228, filed Feb. 11, 2014, 16 pages.

Office Action mailed Oct. 28, 2015, from U.S. Appl. No. 14/179,476, filed Feb. 12, 2014, 7 pages.

Office Action mailed Nov. 19, 2015, from U.S. Appl. No. 14/178,238, filed Feb. 11, 2014, 73 pages.

Office Action mailed Aug. 7, 2014, from U.S Appl. No. 14/178,209, filed Feb. 11, 2014, 12 pages.

Office Action mailed Mar. 16, 2016, from U.S. Appl. No. 14/178,238, filed Feb. 11, 2014, 66 pages.

Office Action mailed Apr. 28, 2016, from U.S. Appl. No. 14/179,476, filed Feb. 12, 2014, 10 pages.

Final Office Action mailed Jun. 6, 2016, from US. Appl. No. 14/178,228, filed Feb. 11, 2014, 22 pages.

\* cited by examiner

FIG. 4.

POOR CALLS NETWORK BREAKDOWN

| NETWORK | GEOGRAPHY | USER | 12 JAN % POOR AUDIO CALLS FROM TOTAL | 12 FEB % POOR AUDIO DISTRIBUTION CALLS | 12 MAR % POOR AUDIO CALLS FROM TOTAL | 12 APR % POOR AUDIO DISTRIBUTION CALLS | 12 MAY % POOR AUDIO CALLS FROM TOTAL | 12 JAN % POOR AUDIO DISTRIBUTION CALLS | 12 FEB % POOR AUDIO CALLS FROM TOTAL | 12 MAR % POOR AUDIO DISTRIBUTION CALLS | 12 APR % POOR AUDIO CALLS FROM TOTAL | 12 MAY % POOR AUDIO DISTRIBUTION CALLS |
|---|---|---|---|---|---|---|---|---|---|---|---|---|
| ALL NETWORKS | ALL | ALL | 0.2 | 0.3 | 0.2 | 0.3 | 0.2 | 0.2 | 0.3 | 0.2 | 0.3 | 0.2 |
| +WIRELESS/INTERNAL | EMEA +GERMANY +MUNICH | | 0 | 0.5 | 0 | 0.5 | 0 | 0.2 | 0.5 | 0.2 | 0.5 | 0.2 |
| | APAC | | 0 | 0.5 | 0 | 0.5 | 0 | 0 | 0.5 | 0 | 0.5 | 0 |
| | US | | 0.2 | 0.3 | 0.2 | 0.3 | 0.2 | 0.2 | 0.3 | 0.2 | 0.3 | 0.2 |
| | FEDERATED | | 0 | 0.5 | 0 | 0.5 | 0 | 0.2 | 0.5 | 0.2 | 0.5 | 0.2 |
| +WIRELESS/EXTERNAL | ALL | ALL | 0.2 | 0.3 | 0.2 | 0.3 | 0.2 | 0.2 | 0.3 | 0.2 | 0.3 | 0.2 |
| +VPN | ALL | ALL | 0 | 0.5 | 0 | 0.5 | 0 | 0 | 0.5 | 0 | 0.5 | 0 |
| +CORPORATE | ALL | ALL | 0.2 | 0.3 | 0.2 | 0.3 | 0.2 | 0.2 | 0.3 | 0.2 | 0.3 | 0.2 |
| +PC-PC | ALL | ALL | 0 | 0.5 | 0 | 0.5 | 0 | 0 | 0.5 | 0 | 0.5 | 0 |
| +CONFERENCE | ALL | ALL | 0 | 0.5 | 0 | 0.5 | 0 | 0 | 0.5 | 0 | 0.5 | 0 |
| +PC-MS | ALL | ALL | 0.2 | 0.3 | 0.2 | 0.3 | 0.2 | 0.2 | 0.3 | 0.2 | 0.3 | 0.2 |
| +MS-GW | ALL | ALL | 0 | 0.5 | 0 | 0.5 | 0 | 0.2 | 0.5 | 0.2 | 0.5 | 0.2 |
| +EXTERNAL | ALL | ALL | 0.2 | 0.3 | 0.2 | 0.3 | 0.2 | 0.2 | 0.3 | 0.2 | 0.3 | 0.2 |
| +FEDERATED | ALL | ALL | 0 | 0.5 | 0 | 0.5 | 0 | 0 | 0.5 | 0 | 0.5 | 0 |
| +EDGE | ALL | ALL | 0.2 | 0.3 | 0.2 | 0.3 | 0.2 | 0.2 | 0.3 | 0.2 | 0.3 | 0.2 |

POOR CALLS GEOGRAPHY BREAKDOWN

| GEOGRAPHY | NETWORK | 12 JAN | | 12 FEB | | 12 MAR | | 12 APR | | 12 MAY | |
|---|---|---|---|---|---|---|---|---|---|---|---|
| | | % POOR AUDIO CALLS FROM TOTAL | POOR AUDIO DISTRIBUTION CALLS | % POOR AUDIO CALLS FROM TOTAL | POOR AUDIO DISTRIBUTION CALLS | % POOR AUDIO CALLS FROM TOTAL | POOR AUDIO DISTRIBUTION CALLS | % POOR AUDIO CALLS FROM TOTAL | POOR AUDIO DISTRIBUTION CALLS | % POOR AUDIO CALLS FROM TOTAL | POOR AUDIO DISTRIBUTION CALLS |
| ALL | ALL | 0.2 | 0.3 | 0.2 | 0.3 | 0.2 | 0.3 | 0.2 | 0.3 | 0.2 | 0.3 |
| ALL | ALL | 0.2 | 0.3 | 0.2 | 0.3 | 0.2 | 0.3 | 0.2 | 0.3 | 0.2 | 0.3 |
| EMEA | ALL | 0 | 0.5 | 0 | 0.5 | 0 | 0.5 | 0 | 0.5 | 0 | 0.5 |
| GERMANY | ALL | 0 | 0.5 | 0 | 0.5 | 0 | 0.5 | 0 | 0.5 | 0 | 0.5 |
| MUNICH | ALL | 0.2 | 0.3 | 0.2 | 0.3 | 0.2 | 0.3 | 0.2 | 0.3 | 0.2 | 0.3 |
| | USER | 0 | 0.5 | 0 | 0.5 | 0 | 0.5 | 0 | 0.5 | 0 | 0.5 |
| | +WIRELESS/INTERNAL | 0.2 | 0.3 | 0.2 | 0.3 | 0.2 | 0.3 | 0.2 | 0.3 | 0.2 | 0.3 |
| | +WIRELESS/EXTERNAL | 0.2 | 0.3 | 0.2 | 0.3 | 0.2 | 0.3 | 0.2 | 0.3 | 0.2 | 0.3 |
| | +VPN | 0 | 0.5 | 0 | 0.5 | 0 | 0.5 | 0 | 0.5 | 0 | 0.5 |
| | CORPORATE EXTERNAL | 0.2 | 0.3 | 0.2 | 0.3 | 0.2 | 0.3 | 0.2 | 0.3 | 0.2 | 0.3 |
| APAC | ALL | 0 | 0.5 | 0 | 0.5 | 0 | 0.5 | 0 | 0.5 | 0 | 0.5 |
| US | ALL | 0.2 | 0.3 | 0.2 | 0.3 | 0.2 | 0.3 | 0.2 | 0.3 | 0.2 | 0.3 |
| FEDERATED | ALL | 0 | 0.5 | 0 | 0.5 | 0 | 0.5 | 0 | 0.5 | 0 | 0.5 |

FIG. 5.

| CALLER | CALLEE | CALLER GEO | CALLEE GEO | CALLER NETWORK | CALLEE NETWORK | TYPE OF CALL | START DATE/ TIME | DURATION (MINS/ SECS) | NMOS SCORE | NMOS DEG | PACKET LOSS | JITTER | LATENCY |
|---|---|---|---|---|---|---|---|---|---|---|---|---|---|
| USER1 | USER2 | BELLEVUE | LONDON | INTERNAL / WIRED | EXTERNAL / WIRELESS | PC-PC | THURS 1ST FEB 10:01AM UTC | 0:54:22 | 3.4 | 0.2 | 1000 | 0.5 | 5 |

| | | | | |
|---|---|---|---|---|
| Comments | | | | — □ X |
| ← → C | 2e64856b47cb40069756d4867aad13177.cloudapp.net:8080/Comments.aspx | | | ○ ☆ ≡ |

Welcome U2_AllAccess
[ Log Out ] [ Change Password ]

⊞ Graphs  ▭ Comments  🔍 Search  ⬜ Export

Select Company: Company ABC ▼

Display details for: NSAT Survey ▼

| | Week | Comments | User | Response | NSAT Rating | QoE Calculated Rating |
|---|---|---|---|---|---|---|
| Select | 10/31/2011 | 6 | amy@email.com | Voice was unreliable a couple of times last week | Somewhat Dissatisfied | 3.2 (Fair) |
| Select | 12/12/2011 | 7 | | | | |
| Select | 08/29/2011 | 10 | bob@email.com | No issues this week! | Very Satisfied | 4.0 (Good) |
| Select | 11/21/2011 | 14 | | | | |
| Select | 09/19/2011 | 11 | alice@email.com | Had a really bad couple of conference calls this week. | Very Dissatisfied | 2.0 (Annoying) |
| Select | 01/23/2012 | 2 | | | | |
| Select | 03/26/2012 | 4 | | | | |
| Select | 07/18/2012 | 2 | | | | |
| Select | 10/17/2011 | 9 | | | | |
| Select | 11/28/2011 | 9 | | | | |
| Select | 07/25/2012 | 3 | | | | |
| Select | 05/21/2012 | 4 | | | | |
| Select | 02/13/2012 | 2 | | | | |
| Select | 08/15/2011 | 21 | | | | |
| Select | 11/07/2011 | 12 | | | | |
| Select | 12/19/2011 | 5 | | | | |
| Select | 06/13/2012 | 3 | | | | |
| Select | 09/06/2011 | 11 | | | | |
| Select | 08/15/2012 | 3 | | | | |
| Select | 03/12/2012 | 4 | | | | |

1 2 3

Notes: Click on user to view per-user metrics (Poor calls, QoE Aggregate scores) against enterprise and industry benchmarks. User QoE Calculated Rating is calculated based on Qoe data for the User during the NSAT survey time interval.

ENHANCED DATA CAPTURE, ANALYSIS, AND REPORTING FOR UNIFIED COMMUNICATIONS

CROSS-REFERENCE TO RELATED APPLICATION

This application is a continuation of U.S. patent application Ser. No. 14/178,209, filed Feb. 11, 2014, which claims the benefit of U.S. Provisional Patent Application No. 61/763,919, filed Feb. 12, 2013, the disclosures of which are hereby incorporated by reference in their entirety.

BACKGROUND

In general, unified communication (UC) systems provide UC services. UC services include communication services (e.g., e-mail services, instant messaging services, voice communication services, video conference services, and the like) and UC data management and analysis services.

UC platforms allow users to communicate over internal networks (e.g., corporate networks) and external networks (e.g., the Internet). This opens communication capabilities not only to users available at their desks, but also to users who are on the road, and even to users from different organizations. With such solutions, end users are freed from limitations of previous forms of communication, which can result in quicker and more efficient business processes and decision making.

However, the quality of communications in such platforms can be affected by a variety of problems, including software failures, hardware failures, configuration problems (e.g., system-wide or within components (e.g., firewalls, load balancers)), and network performance problems. The potential impacts of these and other problems include immediate impact upon end users (both internal and roaming) and inefficient use of functionality that increases overall costs.

Further, given the unprecedented level of consolidation/centralization that UC platforms may enable, a 100,000 user enterprise may accumulate on the order of 1 billion call records and 1 terabyte of data per year. Formally maintaining this data as an accurate and persistent long-term repository for reference and analysis can help an enterprise to meet its technical, business, and compliance needs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments disclosed herein include computer systems and methods that can be used for analyzing service level objectives for call quality, classifying calls into distinct categories, and real-time user notification of call quality and reliability issues.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4 shows an example of a detailed report titled "Poor Calls Network Breakdown";

FIG. 5 shows an example of a detailed report titled "Poor Calls Geography Breakdown";

FIG. 6 shows a table with information relating to a call;

FIG. 7 shows a user interface for accessing responses to a survey relating to voice quality;

DETAILED DESCRIPTION

The present disclosure includes descriptions of various aspects of unified communication (UC) systems, such as UC management and analysis systems, tools, and techniques. In general, UC systems (such as UC systems based on the Lync platform available from Microsoft Corporation) provide UC services. As described herein with respect to various embodiments of the present disclosure, UC services include communication services (e.g., e-mail services, instant messaging services, voice communication services, video conference services, and the like) and UC data management and analysis services, or other services. Representative UC management and analysis services are described in detail below.

Figure 1:
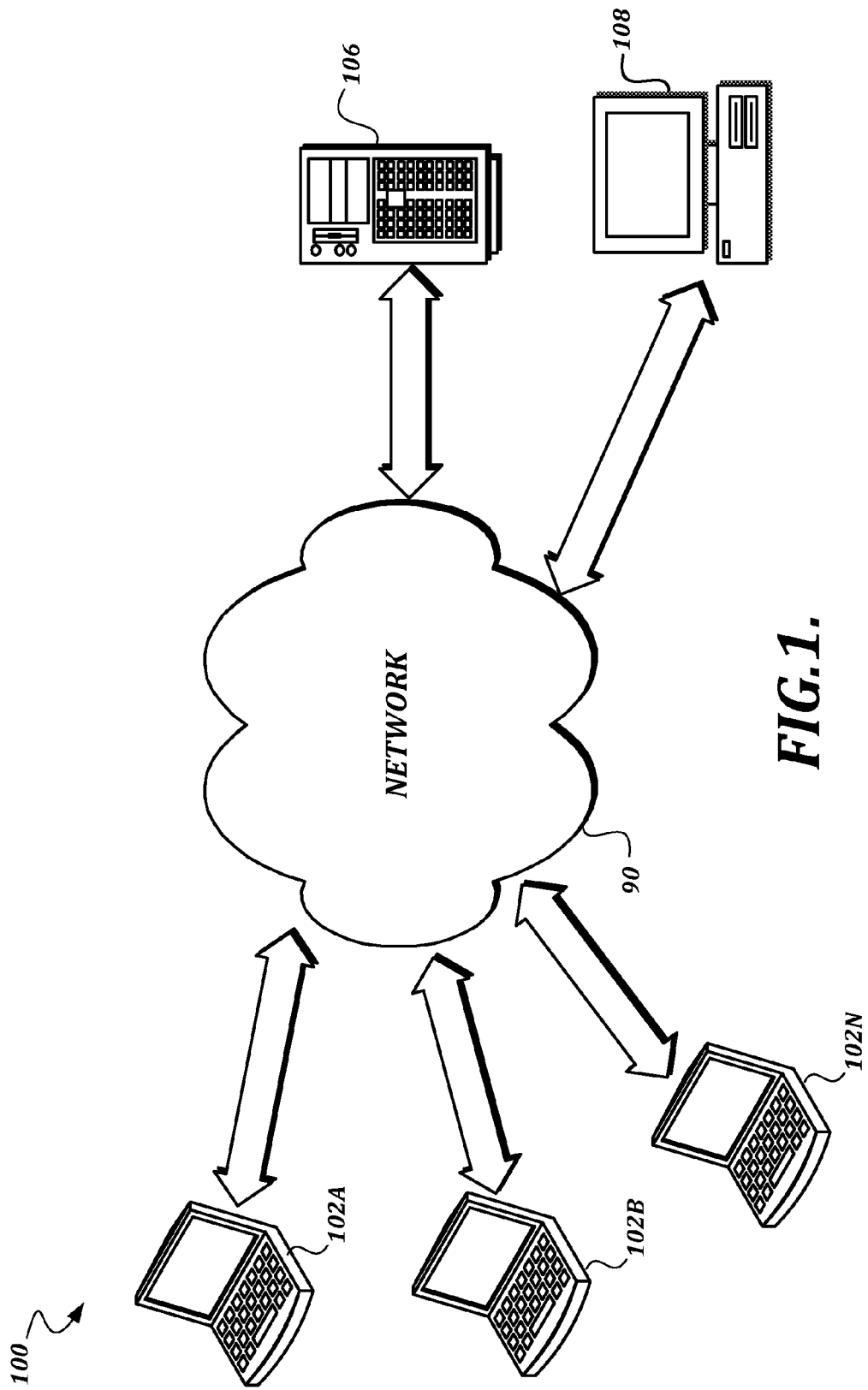
FIG. 1 is a block diagram that illustrates a generalized UC management and analysis system according to various aspects of the present disclosure.

FIG. 1 is a block diagram that illustrates a generalized UC management and analysis system 100 according to various aspects of the present disclosure. In this generalized example, the system 100 includes client computing devices 102A-N, a server 106, and an administrator computing device 108. The components of the system 100 may communicate with each other via a network 90. For example, the network 90 may comprise a wide-area network such as the Internet. The network 90 may comprise one or more sub-networks (not shown). For example, the network 90 may include one or more local area networks (e.g., wired or wireless local area networks) that may, in turn, provide access to a wide-area network such as the Internet. The client devices 102A-N may be computing devices operated by end users of a UC system. A user operating the administrator device 108 may connect to the server 106 to, for example, manage and analyze use of the UC system.

Figure 2:
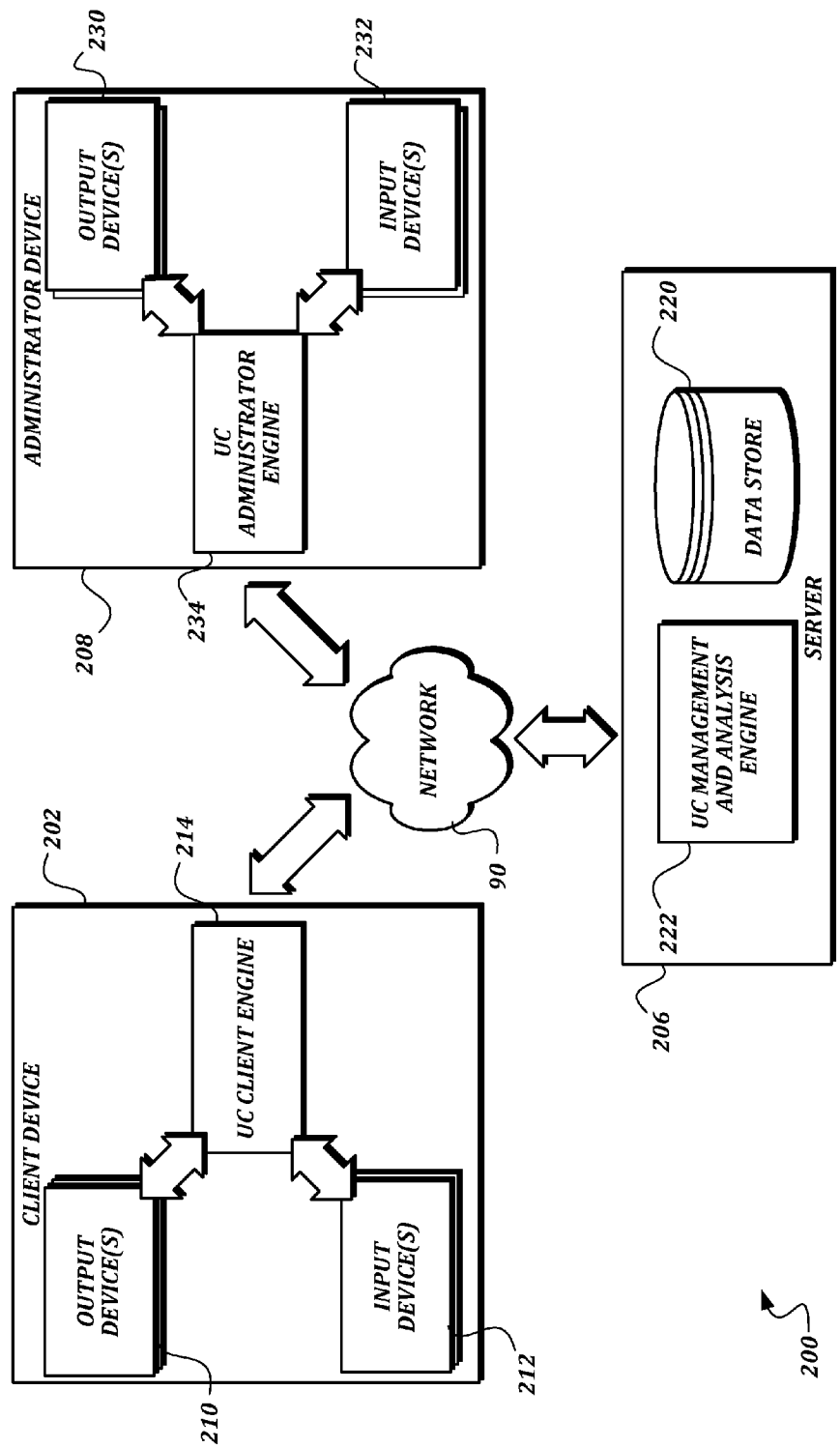
FIG. 2 is a block diagram that illustrates another example of a unified communication management and analysis system.

FIG. 2 is a block diagram that illustrates another example of a unified communication management and analysis system. As shown in FIG. 2, the system 200 comprises a client computing device 202, a server 206, and an administrator computing device 208. In the example shown in FIG. 2, the server 206 comprises a data store 220 and a UC management and analysis engine 222. The data store 220 stores data that relates to operation and use of UC system, as will be further described below. The management and analysis engine 222 interacts with the data store 220.

In the example shown in FIG. 2, the data store 220 can store data and definitions that define elements to be displayed to an end user on a client device 202 or administrator device 208. For example, the data store 220 can store data that describes the frequency, quality, and other characteristics of communications (e.g., voice communications) that occur across an enterprise via a UC system. As another example, a definition defining a set of interface elements can be used to present a graphical user interface at administrator device 208 that can be used by a system administrator that is seeking to diagnose the cause of a reported problem in the UC system, as explained in detail below. As another example, a definition defining a set of interface elements can be used to present a graphical user interface at client device 202 to guide an end user to respond to a survey relating to the end user's experience with the UC system, as explained in detail below. Interface elements, such as text boxes, soft buttons, checkboxes, drop-down boxes, multimedia interface elements (e.g., audio or video players), and/or the like, may receive input from or present output (e.g., to an end user or system administrator).

In the example shown in FIG. 2, the client device 202 includes output device(s) 210, input device(s) 212, and a UC client engine 214. The UC client engine 214 is configured to process input and generate output related to UC services and content (e.g., services and content provided by the server 206). The UC client engine 214 also is configured to cause output device(s) 210 to provide output and to process input from input device(s) 212 related to UC services. For example, input device(s) 212 can be used to provide input (e.g., text input, video input, audio input, or other input) that can be used to participate in UC services (e.g., instant messages (IMs), voice calls), and output device(s) 210 (e.g., speakers, a display) can be used to provide output (e.g., graphics, text, video, audio) corresponding to UC services.

In the example shown in FIG. 2, the administrator device 208 includes output device(s) 230, input device(s) 232, and UC administrator engine 234. The UC administrator engine 234 is configured to receive, send, and process information relating to UC services. The UC administrator engine 234 is configured to cause output device(s) 230 to provide output and to process input from input device(s) 232 related to UC services. For example, input device(s) 232 can be used to provide input for administering or participating in UC services, and output device(s) 230 can be used to provide output corresponding to UC services.

The UC client engine 214 and/or the UC administrator engine 234 can be implemented as a custom desktop application or mobile application, such as an application that is specially configured for using or administering UC services. Alternatively, the UC client engine 214 and/or the UC administrator engine 234 can be implemented in whole or in part by an appropriately configured browser, such as the Internet Explorer® browser by Microsoft Corporation, the Firefox® browser by the Mozilla Foundation, and/or the like. Configuration of a browser may include browser plug-ins or other modules that facilitate instant messaging, recording and viewing video, or other functionality that relates to UC services.

In any of the described examples, an "engine" may include computer program code configured to cause one or more computing device(s) to perform actions described herein as being associated with the engine. For example, a computing device can be specifically programmed to perform the actions by having installed therein a tangible computer-readable medium having computer-executable instructions stored thereon that, when executed by one or more processors of the computing device, cause the computing device to perform the actions. An exemplary computing device is described further below with reference to FIG. 18. The particular engines described herein are included for ease of discussion, but many alternatives are possible. For example, actions described herein as associated with two or more engines on multiple devices may be performed by a single engine. As another example, actions described herein as associated with a single engine may be performed by two or more engines on the same device or on multiple devices.

In any of the described examples, a "data store" contains data as described herein and may be hosted, for example, by a database management system (DBMS) to allow a high level of data throughput between the data store and other components of a described system. The DBMS may also allow the data store to be reliably backed up and to maintain a high level of availability. For example, a data store may be accessed by other system components via a network, such as a private network in the vicinity of the system, a secured transmission channel over the public Internet, a combination of private and public networks, and the like. Instead of or in addition to a DBMS, a data store may include structured data stored as files in a traditional file system. Data stores may reside on computing devices that are part of or separate from components of systems described herein. Separate data stores may be combined into a single data store, or a single data store may be split into two or more separate data stores.

A. Techniques and Tools for Enhanced UC Data Capture, Analysis, and Reporting

Examples in this section describe features of an end-to-end solution for enterprise-level unified communication (UC) data capture, analysis, and reporting. As with other examples described herein, the examples in this section can be used with enterprise-level UC systems.

Overview of UC System with Enhanced Data Capture, Analysis, and Reporting

A UC system with enhanced data capture, analysis, and reporting capabilities as described herein can include one or more of the features described with reference to Examples 1-10 below. More generally, a comprehensive UC system with enhanced data capture, analysis, and reporting capabilities can provide the following functionality:

When used together with an enterprise-level UC platform, a UC system with enhanced data capture, analysis, and reporting capabilities can facilitate cost savings through consolidation, such as by (1) consolidating/replacing hundreds or thousands of disparate PBXs into one centralized global infrastructure; (2) consolidating multiple communications infrastructure components such as audio conferencing, instant messaging, application sharing, video conferencing, etc., into a single infrastructure; and (3) consolidating both internal and remote/external communications by employees, customers, partners, and suppliers into a single infrastructure. Productivity gains can be realized through an increase in collaboration and the speed of business, via an innovative and intuitive end-user experience.

Given the unprecedented level of consolidation/centralization that UC platforms may enable, a 100,000 user enterprise may accumulate on the order of 1 billion call records and 1 terabyte of data per year. Formally maintaining this data as an accurate and persistent long-term repository for reference and analysis can help an enterprise to meet its technical, business, and compliance needs.

A comprehensive UC system with enhanced data capture, analysis, and reporting capabilities can include:

- A highly scalable data warehouse built on SQL Server Analysis Services/OLAP "cubes" to permanently store massive volumes of accurate CDR and quality of experience (QoE) data. The warehouse is scalable up to a million active users or more, for up to ten years or more. This provides a robust and highly scalable business intelligence foundation for the enterprise for its business, technical, and compliance needs.
- A collaboration portal with features to provide access to all of the above reports, with the ability to support detailed queries that may, for example, enable interactive drill-down to analyze UC system performance in areas such as global voice quality. In some embodiments, the collaboration portal is a SharePoint service with a PerformancePoint component, available from Microsoft Corporation.
- Defining, measuring, tracking, and trending KPIs, and aggregating such KPIs into scorecards best suited for the enterprise. Examples of KPIs include active user trends, call counts, and average mean opinion score (MOS) relating to audio quality. A scorecard can be assembled comprising relevant KPIs for the organization. User adoption statistics can be reviewed, and data can be tracked against success metrics, allowing for "course-correction" in a platform deployment, if needed. The return on investment (ROI) of a UC system deployment tends to be directly correlated with the extent of user adoption—the more users use the system, the more the cost savings and the incremental productivity generated by the enterprise. Tracking and precisely measuring actual user adoption is therefore key to estimating cost savings and productivity gains; key relevant statistics include the number of active users, call counts, conference minutes, on-net minutes, etc. Other statistics such as remote usage, communications with federated partners, modality-specific statistics (e.g. video and application sharing), and response groups also can help measure performance. User adoption statistics also play a key role in identifying "problem areas" in an actionable manner. Poor adoption—either across the enterprise or across a specific site or functional unit—could point to a variety of remediation or proactive steps such as training, device selection, voice quality, or other site- or region-specific considerations. Similarly, IT needs to know if adoption is much better than expected, which would often point to success of the deployment.
- Functionality for enterprise-grade billing and CDR for unified communications. Traditional time-division multiplexing (TDM) telephony deployments have tended to have stringent needs around billing. However, significant reduction in domestic and international long-distance charges over the last twenty years, as well as the service consolidation and ability to shift phone calls to "on-net" calls provided by UC platforms, have dramatically changed enterprise approaches to billing needs. Instead of carrier-grade billing for call accounting, enterprises now tend to do a rough reconciliation (e.g. to within 5-10%) of their public switched telephone network (PSTN) phone charges, comparing the carrier bills they receive with internally-generated data based on CDRs and carrier rates. Some enterprises need to charge back their toll costs to appropriate internal cost centers and/or to specific clients. Finally, many enterprises need the ability to track individual CDRs for legal compliance purposes, as well as to detect fraud (e.g., unauthorized external use of enterprise resources or PSTN channels), etc. These needs require a robust enterprise-grade infrastructure for capturing authoritative CDR and billing-related data on a per-call basis, for retrieval and analysis at any point in the future.
- Voice quality metrics and trends. Voice quality is often perceived as "mission-critical" when evaluating communications infrastructure. Enterprises often define, measure, track, and attempt to identify trends in performance in voice quality, and compare them against service level agreements (SLAs). SLAs often apply both at a global level as well as a regional and site level, across the entire enterprise.
- Reports that help to illustrate trends over time in various areas, such as remote usage/"work from home"; collaboration among customers, suppliers, and partners; business activity over the work week, etc.
- Powerful and easily accessible class customization capabilities for creating user interface dashboards and reports, significantly reducing the need to have custom reports externally developed to meet enterprise specific business needs.
- Cost savings through optimization. Cost reduction can be realized, for example, by tracking actual device usage patterns (e.g., headsets vs. desk phones), site-level remote usage utilization for office space consolidation purposes, and consolidating trunks over large collections of sites into centralized SIP trunks, analyzing calling patterns across business units and geographies, to name just a few examples. Each of these examples can provide significant cost savings, especially for large enterprises.

The following examples illustrate some of the key features relating to the techniques and tools described herein for enhanced UC data capture, analysis, and reporting:

Example 1

Data Warehouse for Analyzing Global Communications Activity

An enterprise-wide data warehouse is described that consolidates communications activity in an enterprise into a single data store that provides insights into an enterprise's communication patterns.

In this example, the data warehouse includes the following features:

- ability to store multiple sets of CDR/QoE data from different databases by keeping track of which database server instance the data is imported from;

removing duplicates ("de-duping") of call records based on the session initiation protocol (SIP) dialog ID (in the event that the same calls are logged to different databases);

ability to control data import size to minimize load on the source databases and the UC data management system;

configurable scheduling of data import processes;

data cleansing (e.g., when analyzing conference participants, distinguishing true user participants from services); and calculated charges on person-to-person (P2P) calls and conference usage.

In this example, the data warehouse can pull data from the following sources:

call details record (CDR) data;
quality of experience (QoE) data;
enterprise user data (active directory);
carrier rates data;
custom configuration files to enhance UC platform data (e.g., gateway detail information such as gateway groups and number of channels); and
a data model for business intelligence analytics.

Example 2

KPIs, Metrics, and Financial Reporting Based on Communications Activity

Reporting on various business outcomes based on enterprise user communications activity is described. Reports are built on business models and algorithms that map user communication activity and other inputs (location, media) to financial metrics (cost, savings, etc.).

In this example, features relating to instant and real-time updates (e.g., via mobile device applications) to enterprise communications KPIs (e.g., a selection of three or some other number of important KPIs) are described. For example, a set of reference base KPIs can be used to measure success of a UC platform. KPIs can indicate overall effectiveness and efficiency of a UC platform deployment, and trends that inform the projected effectiveness and efficiency of the deployment. KPIs can be used to identify "problem spots" in the deployment, track user adoption (which affects cost savings as well as user productivity), and identify opportunities to optimize return on investment in the deployment.

In one embodiment, a KPI is used to help determine compliance with SLAs. Further details on SLA compliance are provided in the example below.

Example 3

Analyzing Service Level Objectives for Call Quality

In this example, a technique is described for classification of calls using location/subnet information, call metrics and algorithms for determining SLA intervals, and time slices based on configurable thresholds. The example technique may include following processing steps:

the UC data management system rates audio call quality by evaluating quality metrics against a defined set of acceptable threshold values (e.g., the quality metrics of each call of a set of many calls is evaluated against the acceptable threshold values);

the UC data management system discretizes calls into time intervals (e.g., by hour) and aggregates this data by site (e.g., grouping based on call endpoint subnet);

an SLA compliance algorithm evaluates the number of calls rated as "poor" within each site/time interval combination against SLA compliance requirements; and SLA compliance is reported by the site and rolled up by time intervals. For example, if a time interval (e.g. from 2 p.m. to 3 p.m.) on a certain day is considered to not be compliant, then this will be rolled up into the relevant longer period, such as a month period. Therefore, if 2 p.m. to 3 p.m. on January 17th is non-compliant, the month of January would be considered non-compliant. In other words, a non-compliant time interval within a time period will result in non-compliance for the entire period.

Example 4

Controlled Access to Communications Activity Based on User Personas

In this example, communications activity and reports are secured centrally and made selectively available to users based on various "personas" (e.g., business function or organizational/administrative functions). Access can be scaled from a group level to an individual level. Permissions settings can be used to define different levels of access. Data access also can be restricted based on personas. For example, a user may be restricted to only viewing data controlled by his department, and not other departments, within an organization.

Example 5

Classification of Communication Quality

In this example, techniques are described for classifying calls (video, audio, and multimedia) into distinct categories. These categories are then analyzed using heuristics and probabilistic methods to further map/transform data sets into actionable and prioritized recommendations. The prioritization is computed based on algorithms that consider various factors such as user location, user devices, network conditions, etc. User site information can be used in a heuristic for analyzing call patterns based on organization and/or geography. Example reports also are described for tracking overall voice quality with associated metrics within an organization's environment.

A quality assessment and classification tool can include the following functionality:

A user can identify factors that impact voice quality.

Cube mechanisms can be used to allow for identifying via a custom report less common scenarios of voice quality issues.

A user can filter the potential information to organizational geography.

A user can drill down into specific sets of all calls, filtered "poor calls," etc., to see the actual individual calls and associated key metrics.

A user can see trends of metrics over a period of time, to allow the viewer to identify potential improvements or reduction in voice quality.

A user can determine whether existing investments have been valuable and made a return on investment or not.

A user can identify that potential additional investments will have a return on the investment by addressing a set of identifiable issues.

a. Voice Quality Overview

Maintaining acceptable audio quality requires an understanding of UC system infrastructure and proper functioning of the network, communication devices, and other components. An administrator will often need to be able to quantifiably track overall voice quality in order to confirm improvements and identify areas of potential difficulty (or "hot spots") that require further effort to resolve. There may be a hierarchy of issues, ranging from network issues (typically being both common and important to fix), to issues that are specific to local users, to issues that are specific to remote users, over which an administrator may have little control.

b. Voice Quality Reporting Overview

One way to track audio quality is through reports. By utilizing reports, an administrator can identify hot spots to address and also convey (e.g., to senior management) information that supports broader conclusions about the system (e.g., that a system deployment is being successful over time, or that more investment is required).

Different systems and components may have different ways of classifying whether a call is classified as "poor." In addition, organizations may have differing requirements for call quality, and may wish to have some control over the standards by which a call will be classified as "poor" or not. SLA reporting may focus on sites as defined by subnet. However, not all customers may define subnets, or have the information to configure sites. Additionally, it is a complex process to keep subnet mapping accurate and up to date. However, there is a different set of information which is available, which could provide a very close approximation to users location, and that is geography information. Therefore, to provide an easier deployment model which allows for quicker SLA reports, it can be useful to allow for customers to utilize this same information.

SLA reports also can be used to break down call quality into different aspects which may have impacted the quality of those calls. Examples of factors that could impact audio quality are: (a) the split of wired vs. wireless calls (potentially, audio quality impacts can be due to wireless issues); (b) device characteristics (devices can impact audio quality as perceived by the end user, especially unsupported devices or those without the correct drivers); (c) the effects of gateways between devices; (d) remote users vs. users local to known sites (e.g., if most of the audio quality issues are driven by remote users, this information can be very useful). Identifying situations that may apply with respect to factor (b), above, may require not utilizing network QoE metrics, but other metrics such as Sending MOS (quality of audio stream being sent from user).

c. Example Information for Enhanced Voice Quality Analysis and Reporting

This section describes examples of information that can be used for enhanced voice quality analysis and reporting.

Classification of Poor Calls:

In order to isolate a grouping of calls with poor voice quality, it is important to have consistent and meaningful classification of calls. For example, wireless calls which have poor voice quality are important to group together to identify common patterns (e.g., whether the calls involve the same user) and to take appropriate action (e.g., educate the user to not use wireless, upgrade the wireless infrastructure).

Additionally, some problems may have more impact on voice quality than others, even within the same call. For example, a user who is using a wireless connection and is roaming outside the user's usual network may be calling another user who is on the corporate network using a wired connection. In this case, the overall experience may be impacted by the first user's wireless connection. An analysis of the conditions at the two endpoints can be conducted to determine which endpoint is more likely to impact a call and highlight one or more items to consider addressing (e.g., by encouraging a user to switch from a wireless connection to a wired connection for the next call).

Table 1 below includes examples of expected classifications of calls within the UC system. In this example, a call with two endpoints is classified based on the endpoint with the lowest quality classification. For example, if a first endpoint uses a wireless connection and a second endpoint has similar conditions except that the second endpoint uses a wired, corporate connection, the call will be classified based on the first endpoint. The following table is ordered with worst case being listed first:

TABLE 1

Classification of poor calls.

| Classification | Scenario | Types of issues |
|---|---|---|
| User (P-U) | VPN | Incorrectly utilizing VPN to access the network and, by consequence, using audio over TCP. May be wired or wireless; until VPN is addressed it is hard to assess other impacts. Admin needs to determine the number of calls and whether this is associated with a certain set of users, and allow for user education. |
| User (P-U) | Wireless/External: User is external to the main network and is using wireless. | Though potentially there are issues (e.g., with an edge server) independent of wireless, admin first needs to address users use of wireless. Admin needs to determine the number of calls and whether this is associated with a certain set of users, and allow for user education. |
| User (P-U) | Wireless/Internal: User is on internal network, but is using wireless. | Admin needs to determine the number of calls and whether this is associated with a certain set of users, and allow for user education. |

TABLE 1-continued

Classification of poor calls.

| Classification | Scenario | Types of issues |
| --- | --- | --- |
| External (P-E) | Federated | Federation allows users in one enterprise (or organization) to communicate with users in another enterprise (or organization). Users in the "Federated" enterprise are called "Federated partners." Calls to/from a specific federated partner may be poor because of internal challenges or a specific federated partner's network/infrastructure. Being able to identify if all federated partners are having issues (e.g., with a set of internal users) or a specific partner is important. Can break down by user/organization to identify potential groups of users with federated users, as well break down based on individual federated partners. |
| External (P-E) | Edge | Potentially, a single edge server or an array of edge servers has bandwidth problems, is being overloaded, or is incorrectly configured. Being able to identify which edge servers are having issues, and which sets of users maybe having issues (because they are using TCP as an example) is important. Can break down based on user/organization to identify potential group of users with issues and/or based on individual groupings of edge servers. |
| Corp-Net (P-C) | PC-PC: User is making a call to another user, in same or different location. | Depending on network links, the audio may be impacted. Identifying which network links are impacted is important. By being able to break down which organization/geographic area is seeing degraded audio, the admin is able to see which locations are impacted. |
| Corp-Net (P-C) | Conference | Calls from users to multipoint control units (MCUs) are impacted, potentially because of the users' locations on a network, or because of the data center network, the actual MCU being overloaded, or a bad configuration. Can break down based on user organization/geographic area to identify potential locations that are having bad audio quality due to local network issues. In addition, the grouping of MCUs are also shown, to allow for potentially a single MCU or a pool of MCUs to be highlighted as impacting audio quality. |
| Corp-Net (P-C) | UC<->GW (bypass): Calls between a user's PC and the gateway (GW) which are bypassing the mediation server (MS). | Similar to conference calls, the audio quality may be impacted by the users' locations on the network, the GW data center network, the GW being overloaded, or a bad configuration. Can break down based on user organization/geographic area to identify potential locations that are having bad audio quality due to local network issues. In addition, the grouping of MS's are also shown, to allow for potentially a single MS or pool of MS's to be highlighted as impacting audio quality. |
| Corp-Net (P-C) | UC<->MS (non-bypass): Calls between a user's PC and the mediation server. | Similar to conference calls, the audio quality may be impacted by the users' locations on the network, the MS data center network, the MS being overloaded, or a bad configuration. Can break down based on user organization/geographic area to identify potential locations that are having bad audio quality due to local network. In addition, the grouping of MS's are also shown, to allow for potentially a single MS or pool of MS's to be highlighted as impacting audio quality. |
| Corp-Net (P-C) | MS<->GW (non-bypass): Calls between an MS and the GW. | Similar to conference calls, the audio quality may be impacted by the MS locations on the network or data center, or GW locations on the network or data center network, or by either being overloaded, or a bad configuration. Can break down based on server site of the MS or GW. |

Grouping of Related Calls:

The table above highlights classification of calls with certain general common characteristics, but this could result in a large number of calls across the organization that are not actionable. For example, if a certain amount of low voice quality is expected but there is real hot spot of issues within a certain set of users (e.g., a particular office), those poor calls could be hidden by the wider organization's good calls. Therefore, breaking down the classification to focus on a specific area can be useful.

Although the breakdown could be based on any of several factors (e.g., time of day, specific site, etc.), in at least one embodiment the break down is based on geography. This has the advantage of being generally aligned with users' interactivity (e.g., users who are in the Singapore geography are likely using the Singapore network more often) and any future training requirements. If geography information is not available or reliable, the value of breaking down the classification in this way is reduced.

In addition to current user geographies, there is a need for several classifications to have additional groupings that do not exist in current user geographies. These are for infrastructure components (MCUs, MS, GWs) which are potentially not in the same locations as users, data centers, etc., as well as for federated partners whose actual geography is not accurately known. Therefore, on top of user geographies, additional elements can be added into the geography hierarchy for voice quality purposes, as follows:

Existing Geography Hierarchy
   Region→Country→Site/Province
     Office
       1. Users
       2. <Infrastructure Components>
     <Infrastructure Site>
       1. <Infrastructure Components>
   Federation
     <Domain 1>
     <Domain 2>

Additional infrastructure components may exist within the same geographies as users, and can be within the same offices or, potentially, in unique locations (e.g., data centers). It is possible to have additional locations added to the existing geography hierarchy, with the potential to break these down to the calls associated with particular users or infrastructure components.

For federation, it is expected that although federated partners may share some of the same locations as an organization's geography, it may not be possible to confirm the location, since additional geographical information is not available. Therefore, federation can be a new element in the top level hierarchy with the ability to break down to each individual partner.

Classification of Poor Calls and Thresholds:

In order to determine what potential problems exist, it is vital to have a clear definition of what a poor call is, and what is an acceptable amount of poor calls. The definition of a poor call can be provided by a UC platform, by a customer, or in some other way. Some example thresholds for acceptable amounts of poor calls are as follows:

P-U calls: 0.5%;
   P-E calls: 1.5%;
   P-C calls: 0.1%; and
   All calls: a sum of the percentages above.

These thresholds can be set by default, and can be overridden if desired.

Call Counts:

Not all classifications/geographies with poor audio quality will require the same level of attention. For example, a geography which is having 1 poor call out of 10, is likely worth investing more time in than a geography with 1 poor call out of 100. Therefore, it is important that wherever information is being displayed, the size of the voice quality problem can be compared. To this end, the following metrics can be shown:

Percentage of Poor Audio Calls from Total: the percentage of poor calls of a specific classification compared to the total of all calls in all classifications (e.g., APAC (Asia-Pacific) user calls with a poor wireless classification is 10 out of 1000 total calls in the enterprise—hence 1%);

Percentage of Poor Audio Calls: the percentage of poor calls of a specific classification compared to the total of classification calls (e.g., APAC user calls with a poor wireless classification is 10 out of 50 total calls—hence 20%);

Percentage of Poor Audio Calls Distribution: the percentage of poor calls of a specific classification compared to the total of all poor calls in all classifications (e.g., APAC user calls with a poor wireless classification is 10 out of 100 total poor calls in the enterprise—hence 10%);

Poor Audio Calls: the actual number of poor calls for that classification (e.g., the number of APAC user calls with a poor wireless classification is 10); and Audio Calls: the actual total number of calls for that break down (e.g., the number of APAC user calls is 50).

Classification Call Summary:

For each grouping of poor calls, it can be useful to see details of the associated poor calls, e.g.:

"To" (target of call);
   "From" (source of call);
   Time of day & length of call;
   Source location (geography, organization, site);
   Target location (geography, organization, site);
   Type of call (P2P, Conference, PSTN, etc.);
   Infrastructure used (MCU, GW, etc.); and/or
   QoE information (e.g., network MOS (NMOS), jitter, latency, packet loss).

Depending on factors such as the selected grouping of poor calls, other information may be more relevant than the examples provided above.

Using information described herein, a customer can:

view trends of the overall system and specific call classifications/geographies to identify any improvements or degradation in overall voice quality;

where necessary, break down an overall superset of information (e.g., global voice quality) and drill down into specific areas to see if there is a hotspot of problems (e.g., a specific office using wireless connections);

find the top X classifications/geographies that likely require the immediate attention without the need to manually drill down;

if certain networks are consistently providing low quality audio, focus attention on determining a solution;

if a certain range of users is utilizing unsupported devices, determine a path for these users to utilize correct devices;

if certain users are experiencing bad quality audio while working remotely, determine if any technical solution is available (such as better networks) or provide better education to end users;

if certain gateways are providing bad audio quality, confirm whether those gateways are appropriate or need to be upgraded; and/or use trends to be able to identify that relevant prior actions have been successful or if additional actions are required.

d. Example Dashboards

In this example, a user (also called a "viewer" in this context) has access to dashboards that provide information.

Global Trends Dashboard:

The viewer is interested in understanding global or call categorization/geography trends to determine if there has been an improvement in overall voice quality. A global trends dashboard can provide a top level summary of information and trends. This can be at the global level or with the ability to select (via filters and hierarchies) trends for a certain classification/geography pairing. A global trends dashboard can provide the following filters and reports:

Filter 1—Trailing Period (e.g., 7 days, 6 weeks, 12 weeks, 6 months, 12 months)—by default, this can be 12 weeks;

Filter 2—Geography hierarchy;

Filter 3—Call Classification hierarchy;

Report 1—Poor Call Summary Table: shows the percentage of Poor Audio

Calls from Total, Poor Call Threshold, % Poor Audio Calls Distribution, Poor Audio calls, and Audio calls. An example of this table is shown below in Table 2:

TABLE 2

Poor Call Summary Table (last 12 months)

| Network Type | % Poor Audio Calls from Total | Threshold | % Poor Audio Calls Distribution | Poor Audio Calls | Audio Calls |
|---|---|---|---|---|---|
| All | 2.05% | 2.00% | 100% | 184 | 8972 |
| Corporate | 1.2% | 0.10% | 62.5% | 115 | 7182 |
| External | 0.4% | 1.40% | 21% | 38 | 1428 |
| User | 0.3% | 0.50% | 17% | 31 | 362 |

Figure 3:
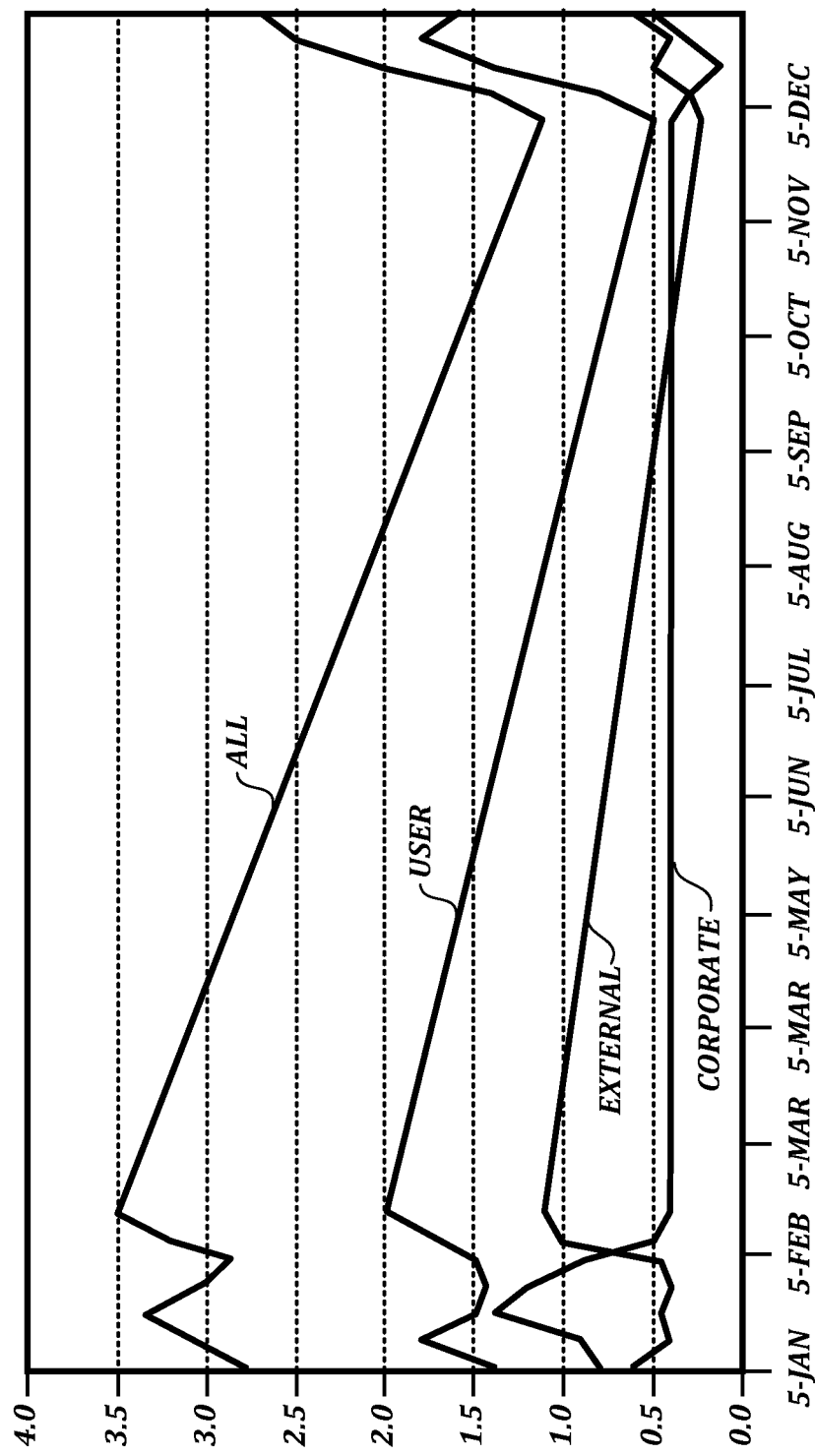
FIG. 3 is a line graph that shows a percentage of poor calls for a relevant trailing period.

Report 2—Line graph: for the relevant trailing period, shows the percentage of Poor Calls for P-U, P-E, P-C. For example, if looking at training for the last 12 months, then this will show the scores in that period. An example of this line graph is shown in FIG. 3.

Top/Specific Problems Dashboard:

The viewer is interested in knowing the biggest problem areas that require more investigation across all possible areas. In this case, the viewer does not want to browse all possible areas, but instead to be quickly directed to specific areas to focus on (e.g., when a lot of users are using VPN). Or, the viewer has a specific theory or potential problem that they wish to investigate. For example, a lot of users in a certain geography are complaining about poor voice quality, but no root cause is known. In this case, the viewer wishes to see all information about that specific geography, including all call classifications, and then carry out further investigations to identify what is common to the complaining users.

A top/specific problems dashboard can use call classification as a first level of the hierarchy that can be broken down by geography, or can use geography as a first level of the hierarchy that can be broken down by call classification.

A top/specific problems dashboard also can use site/subnet mapping, which can then be broken down by call classification.

Call Classification Breakdown Dashboard (Top/Specific Problems):

Using this dashboard will allow an organization to select a date range that is appropriate and see information associated with the call classifications as the most important grouping. This allows the organization to theorize that, for example, users are using wireless too much, and then find out which geography or geographies of users are using wireless too much. In addition, to save the viewer from having to drill down into all possible combinations of call classification and geography, a report can show the top call classification/geographies that have the worst poor call percentage.

A call classification breakdown dashboard can provide the following filters and reports:

Filter 1—Trailing Period (e.g., 7 days, 6 weeks, 12 weeks, 6 months, 12 months)—by default, this can be 12 weeks;

Filter 2—Geography hierarchy;

Report 1—Top Problems (worst percentage of total poor calls) broken down by geography, examples of which are shown in Tables 3 and 4, below:

TABLE 3

Top Problems (worst percentage of total poor calls) by geography

| Geography | % Poor Audio Calls | Poor Call Threshold | Poor Quality Calls | Total Audio Calls |
|---|---|---|---|---|
| Singapore | 1.38% | 2.00% | 184 | 8972 |
| Adelaide | 0.76% | 0.10% | 115 | 7182 |
| New York | 0.39% | 1.40% | 38 | 1428 |
| Barcelona | 0.23% | 0.50% | 31 | 362 |

TABLE 4

Top Problems by geography, including same-site calls and inter-site calls

| Geography | % Poor Audio Calls | Poor Call Threshold | Poor Quality Calls | Total Audio Calls |
|---|---|---|---|---|
| Singapore | 1.38% | 2.00% | 184 | 8972 |
| Adelaide <–> New Zealand | 0.76% | 2.00% | 115 | 7182 |
| Singapore <–> Beijing | 0.39% | 2.00% | 38 | 1428 |
| Barcelona | 0.23% | 2.00% | 31 | 362 |

Report 2—Top Problems (worst percentage of poor calls for all calls within the User call classification) broken down by geography;

Report 3—Top Problems (worst percentage of poor calls for all calls within the Corporate call classification) broken down by geography;

Report 4—Top Problems (worst percentage of poor calls for all calls within the External call classification) broken down by geography; and Report 5—Specific Problems Table, which has the following columns for the trailing period:

Column 1: Expandable call classification hierarchy (e.g. All, External/User/Corporate, User-Internal/Wireless, etc.);

Column 2: Expandable geography hierarchy (e.g., Global, Region, Country, Office); and Column N+: Breakdown of both % Poor Audio Calls from total, and % Poor Audio Calls distribution.

A user can drill down into a specific period (e.g., if a user looks at a specific week and wants to see per day or per hour for that week).

Reports can be formatted for viewing in a variety of ways. For example, Reports 1-4 above can be presented side by side, with each report in a table format similar to the example table for Report 1 provided in Table 3, above, or in some other layout, to give a user a convenient view of the reported information (e.g., top problems).

Reports can include a significant amount of detail; the detail that is actually presented can depend on factors such as an administrator's preferences. FIG. 4 shows an example of a detailed report titled "Poor Calls Network Breakdown." The report in FIG. 4 shows network and geography information along with percentages of poor audio calls, by month. The shaded cells or data points in FIG. 4 are highlighted to indicate (e.g., to an administrator) that poor call thresholds have been exceeded.

From these reports, it will be possible to select a specific cell in a table and navigate to a Call Summary Report.

Geography Breakdown Dashboard (Top/Specific Problems):

Using this dashboard will allow an organization to select a date range that is appropriate and see information associated with the geography hierarchy as the most important grouping. This allows the organization to theorize that, for example, a geography of users is having a significant problem and drill down into the call classifications to see if this problem is consistent across all call types or for a specific type of call. In addition, to save the viewer from having to drill down into all possible combinations of geography and call classification, a report can show the top geographies/call classification that have the worst poor call percentage.

A Geography Breakdown dashboard can provide the following filters and reports:

Filter 1—Trailing Period (e.g., 7 days, 6 weeks, 12 weeks, 6 months, 12 months)—by default, this can be 12 weeks;

Filter 2—Call Classification hierarchy;

Report 1—Top Problems (worst percentage of total poor calls) broken down by call classification with geography information, an example of which is shown in Table 5, below:

TABLE 5

Top Problems by call classification, with geography information

| Classi-fication | % Poor Audio Calls from Total (of Geography) | Threshold | % Poor Audio Calls Distribution (all Geographies) | Poor Audio Calls | Audio Calls |
|---|---|---|---|---|---|
| Wireless/Internal - Singapore | 1.38% | 2.00% | 15% | 184 | 8972 |
| Wireless/Internal - Munich | 0.76% | 0.10% | 10% | 115 | 7182 |
| VPN - Singapore | 0.39% | 1.40% | 5% | 38 | 1428 |

Report 2—Specific Problems Table, which has the following columns for the trailing period:
Column 1: Expandable geography hierarchy (e.g., Global, Region, Country, Office);
Column 2: Expandable call classification hierarchy (e.g. All, External/User/Corporate, User-Internal/Wireless, etc.); and
Column N+: Breakdown of both % Poor Audio Calls from total, and % Poor Audio Calls distribution.

A customer can drill down into a specific period (e.g., if a user looks at a specific week and wants to see per day or per hour for that week).

Reports can include a significant amount of detail; the detail that is actually presented can depend on factors such as an administrator's preferences. FIG. 5 shows an example of a detailed report titled "Poor Calls Geography Breakdown." The report in FIG. 5 shows network and geography information along with percentages of poor audio calls, by month. The shaded cells or data points in FIG. 5 are highlighted to indicate (e.g., to an administrator) that poor call thresholds have been exceeded.

From these reports, it will be possible to select a specific cell in a table and navigate to a Call Summary Report or a Call Breakdown Report, as explained in further detail below.

Call Breakdown Report (Top/Specific Problems):

When a number of calls within a call classification/geography pairing is large, it can be difficult for the viewer to scan a list of calls and identify what may be a common problem. For example, there could be an extremely large number of users with occasional PC-to-PC issues, or a concentrated set of users who are having a large number of failures. Therefore, a call breakdown report can be useful for highlighting some of the likely common issues to investigate.

A Call Breakdown Report can provide the following filters and reports:

Filter 1—Start Date & End Date;

Filter 2—Geography Hierarchy;

Filter 3—Call Classification Hierarchy;

Report 1—Top X users: top X users who have the most poor calls, including the % Poor Audio Calls from Total, % Poor Audio Calls Distribution, and the relevant thresholds and call counts (see Table 6, below):

TABLE 6

Top Users (worst percentage of total poor calls)

| User | % Poor Audio Calls from Total | % Poor Audio Calls Distribution | Threshold | Poor Audio Calls | Audio Calls |
|---|---|---|---|---|---|
| User1 | 1.38% | 30% | 2.00% | 184 | 8972 |
| User2 | 0.76% | 20% | 0.10% | 115 | 7182 |
| User3 | 0.39% | 10% | 1.40% | 38 | 1428 |
| User4 | 0.23% | 10% | 0.50% | 31 | 362 |

Report 2—Top X infrastructure components: top X infrastructure components that are used within the calls and have the most poor calls, including % Poor Calls, % Total Poor Calls, and the relevant thresholds and call counts (similar to the user table shown in Table 6, above, with Infrastructure components in the first column);

Report 3—Counts: see example in Table 7, below:
Total number of users that are impacted and having a poor call;
% of users that are impacted;
Total number of infrastructure components that are impacted and having a poor call;
% of infrastructure components impacted;

TABLE 7

Overall Impact report

| Overall | # impacted | % of total impacted |
|---|---|---|
| Users | 100 | 25% |
| Infrastructure | 8 | 75% |

Report 4—Voice Quality Metrics: see example in Table 8, below:
  Average QoE Information across all calls (NMOS, Jitter, Latency, Packet Loss); and
  QoE Information across Top 10% of calls (NMOS, Jitter, Latency, Packet Loss).

TABLE 8

Voice Quality Metrics report

| Metric | NMOS Degradation | Jitter | Packet Loss | Latency |
|---|---|---|---|---|
| Average | 0.5 | 0.3% | 184 | 8972 |
| Top 10% | 1.6 | 0.4% | 115 | 7182 |

From each of these reports it will be possible to select a specific cell and navigate to the "Call Summary Report" which will show the calls associated with that metric.

Call Summary Report (Top/Specific Problems):

This report includes a table which displays a summary of all the poor calls that occurred within certain period.

A Call Summary Report can provide the following filters and reports:
  Filter 1—Trailing Period (e.g., 7 days, 6 weeks, 12 weeks, 6 months, 12 months)—by default, this can be 12 weeks;
  Filter 2—Organization hierarchy (e.g., Global, Region, Country, Office);
  Filter 3—Network hierarchy (e.g., All, P-E/P-U/P-C, P-U-Internal/Wireless, etc.);
  Filter 4—Type of call (e.g., All, MCU, GW, P2P); and
  Report 1—shows all poor calls in sortable columns, such as: To (Callee),
  From (Caller), Organization info (Region/Country/Office), Caller/Callee Call Classification Hierarchy (e.g., geography, network), Type of call, Start Date/Time, Duration (mins/secs), NMOS Score, NMOS Degradation, Packet Loss, Jitter, Latency, Mediation Server (if applicable), Gateway (if applicable), MCU (if applicable), Edge Server (if applicable); an example of such a table is shown in FIG. 6.

From this report it is possible to select a call (e.g., by selecting a row in the table), and go to a call detail report.

Example 6

Analysis of Calls Using Correlations/Patterns

In this example, enterprise calls are analyzed based on simultaneous events or conditions within an environment (e.g., user's environment, user's network/site, enterprise environment) and heuristics are utilized to establish correlation or cause-effect information for various call conditions and scenarios. For example, poor quality calls may be correlated with a user adding video and application sharing while on a low bandwidth connection.

Example 7

Real-Time User Notification of Call Quality and Reliability Issues

In this example, features are described that facilitate proactively notifying users of conditions impacting call quality and reliability via instant messaging or other messaging channels (such as e-mail). Users are notified based on the configurable metrics/parameters (which can be tuned by system administrators) and provided with information mined from call detail and voice quality records. This information is used to provide feedback to the user (e.g., feedback relating to call conditions, as well as other remediation recommendations). A channel for users to provide feedback to operations teams is provided. Operational teams can be alerted to issues relating to specific user groups (e.g., executive users).

For example, a real-time user notification service can monitor QoE servers or a UC data manager database and run a query periodically. Based on the result of the query, the service notifies end users. Both the notification message and the channel (e.g., IM, e-mail) can be configured.

The screen shot in FIG. 7 shows a user interface for accessing responses to a survey relating to voice quality. The surveys themselves can be conducted using techniques and tools described in detail below.

In the example shown in FIG. 7, survey responses associated with specific users are shown in a table. Each row in the table includes a user ID (e.g., e-mail address), user comments, the user's overall voice quality rating (e.g., Very Satisfied, Somewhat Satisfied, Somewhat Dissatisfied, Very Dissatisfied, etc.), and a numeric QoE rating. The numeric QoE rating is calculated based on QoE data for the user during a survey time interval. The user interface allows clicking on the user ID to view additional information, such as per-user metrics (e.g., poor calls, QoE aggregate scores) compared against enterprise and/or industry benchmarks. The user interface also allows selection of results corresponding to different surveys, which can be identified, for example, by the date on which the survey was conducted. The user interface also provides information on how many comments a particular survey has generated. The user interface includes functionality for graphing, commenting on, searching, and exporting information. The user interface can be used for multiple organizations or companies, as shown in the "Select Company" drop-down box. The user interface can include features for securely viewing such information (see the "Log Out" and "Change Password" links). The user interface can be presented in a Web browser or as part of a dedicated, custom application.

Figure 8:
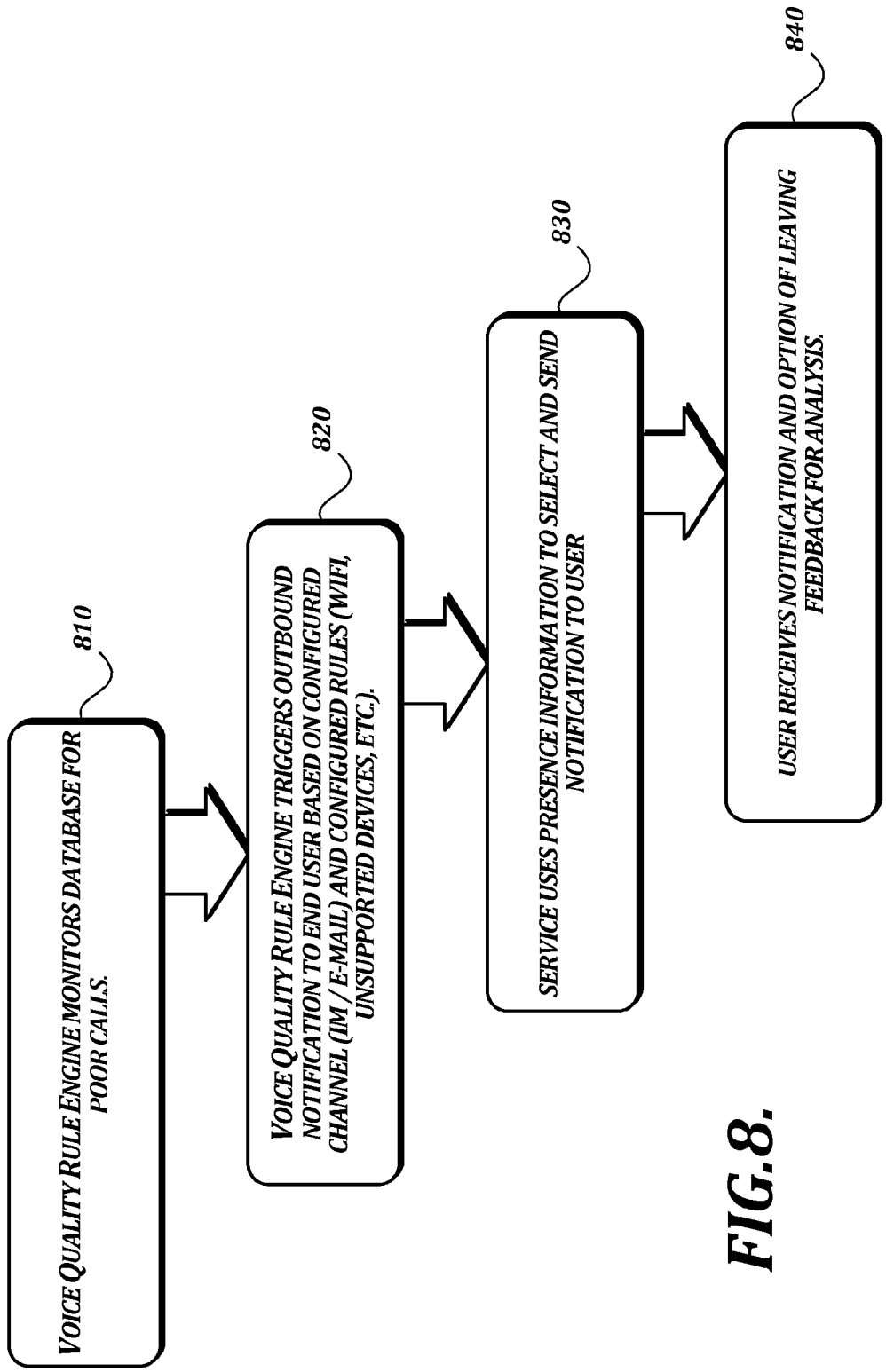
FIG. 8 is a flow chart that shows how targeted notifications and user feedback can be used to improve overall voice quality.

FIG. 8 is a flow chart that shows how targeted notifications and user feedback can be used to improve overall voice quality. The decision whether to send targeted notifications also can be based on a user's situation or a usage scenario. For example, a rules engine can detect if the user making a call was on Wifi and/or using unsupported devices, which can affect call quality. The notification can be tailored to be appropriate to the situation. This results in a more accurate communication outreach and actionable results. An operations team can maintain a record of users who have been contacted (or "pinged") to limit the possibility that users will become annoyed or overwhelmed with information, while also allowing the team to determine if a follow-up message might be helpful.

Call quality metrics are stored in databases (e.g., QoE and/or CDR databases). In the example shown in FIG. 8, in step 810 a voice quality rule engine monitors a database (e.g., a QoE database) for poor calls. In step 820, the voice quality rule engine triggers an outbound notification to an end user via a predetermined channel (e.g., IM, e-mail), in accordance with rules that apply to the conditions of a communication in which the user participated (e.g., rules related to WiFi communications, rules related to communications using unsupported devices, etc.). In step 830, the triggered outbound notification is handled by a message generation component of a service that uses presence information to determine whether use IM or e-mail for delivering the notification. For example, if a user is detected to be online and available, the component can send an IM. As another example, if the user is detected to be unavailable (e.g., offline, or online but busy), the component can send an e-mail. In step 840, the user receiving the notification is given the option (e.g., via a link in the notification) to provide feedback for analysis.

Figure 9:
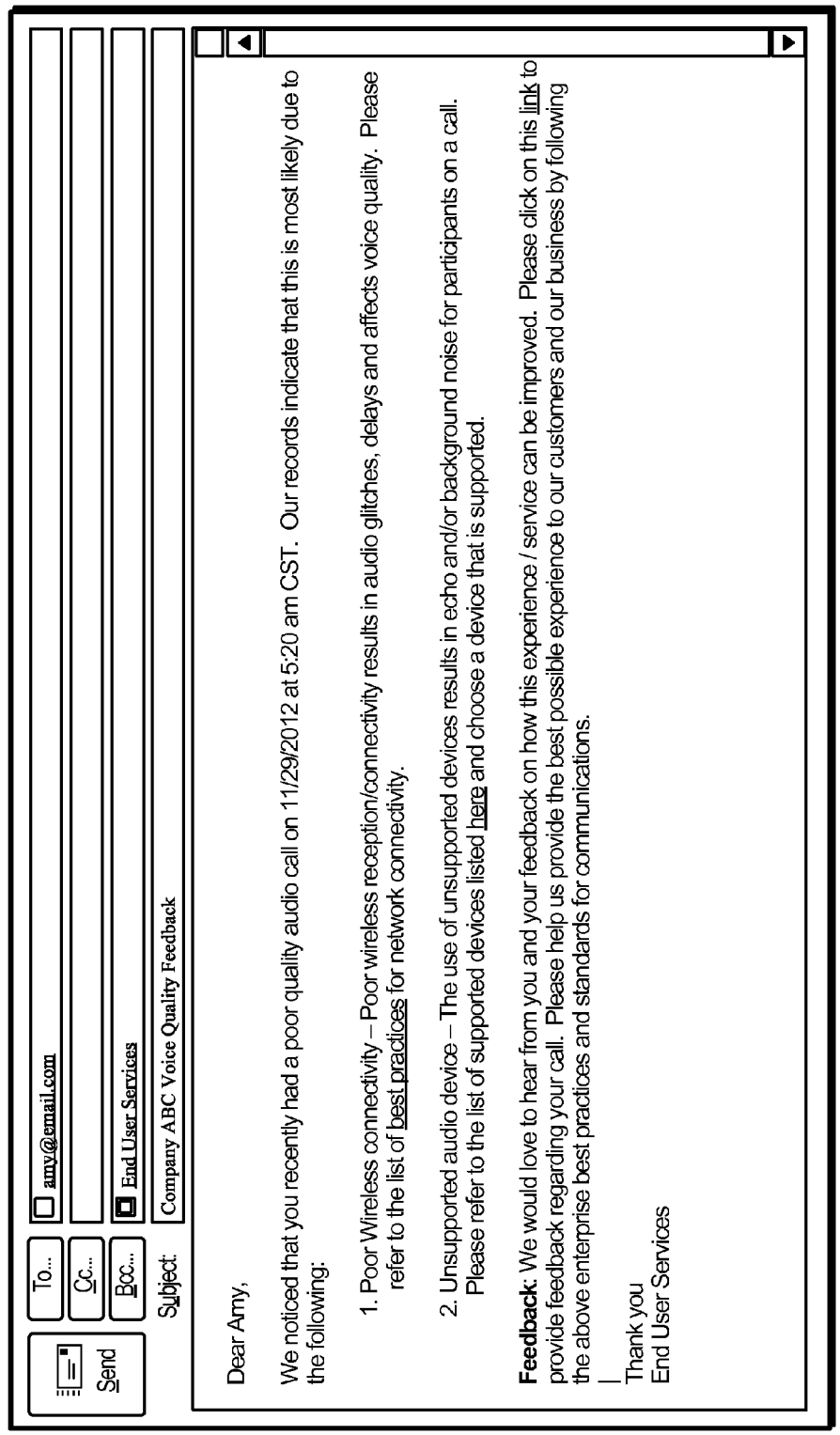
FIG. 9 is a screenshot of an e-mail generated by a message generation component.

FIG. 9 is a screenshot of an e-mail generated by a message generation component. The "To:" field of the e-mail includes a white indicator graphic next to the user's e-mail address that provides presence information. In this example, the white color of the graphic indicates that the user is offline. The "Bcc:" field includes a green indicator graphic that indicates that "End User Services" is online and available. (The green color is not shown in FIG. 9.) The text of the e-mail confirms that a call in which the user participated had poor voice quality, and suggests possible causes (poor wireless connectivity, unsupported audio device) of the poor voice quality. The e-mail provides underlined links (see items numbered "1." and "2." in the text of the e-mail message in FIG. 9) to help the addressee avoid similar problems in the future. The e-mail also requests feedback and provides an underlined link in the "Feedback" section of the e-mail for this purpose.

Figure 10:
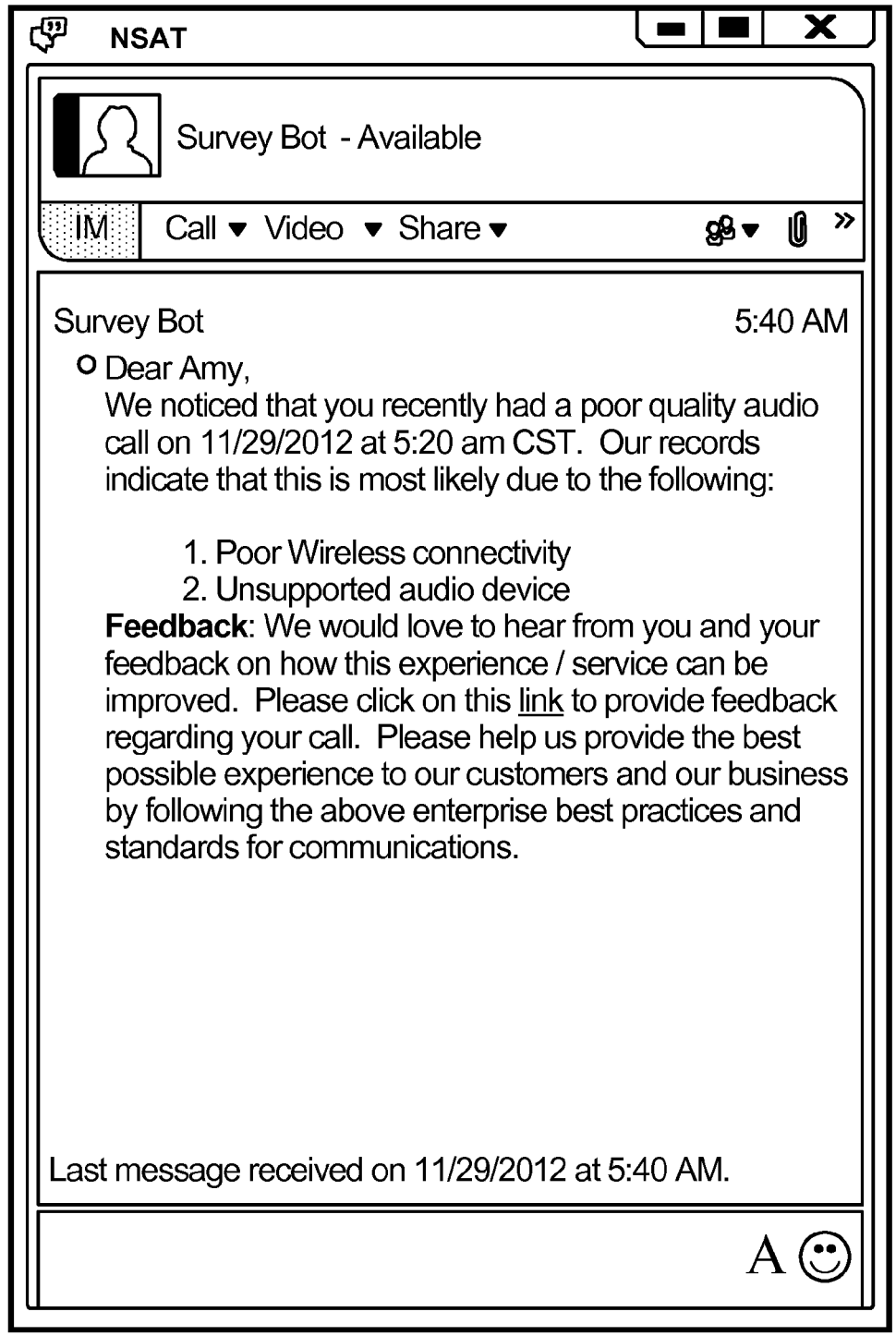
FIG. 10 is a screenshot of an instant message (IM) generated by a message generation component.

FIG. 10 is a screenshot of an instant message (IM) generated by a message generation component. A green indicator graphic indicates that "Survey Bot" is online and available. (The green color is replaced with dark shading in FIG. 10.) The text of the IM confirms that a call in which the user participated had poor voice quality, and suggests possible causes (poor wireless connectivity, unsupported audio device) of the poor voice quality. The IM also requests feedback and provides a link (underlined in the "Feedback" section of the IM) for this purpose.

Example 8

Per-User Metrics, Voice Quality Metrics, and Scorecard with Benchmarking

In this example, features are described that provide a per-user "score" for enterprise communications using an algorithm to compute a single score that takes into account the user's communication activity (based on various parameters and metrics), and that allow for benchmarking against a "peer group."

Figure 11:
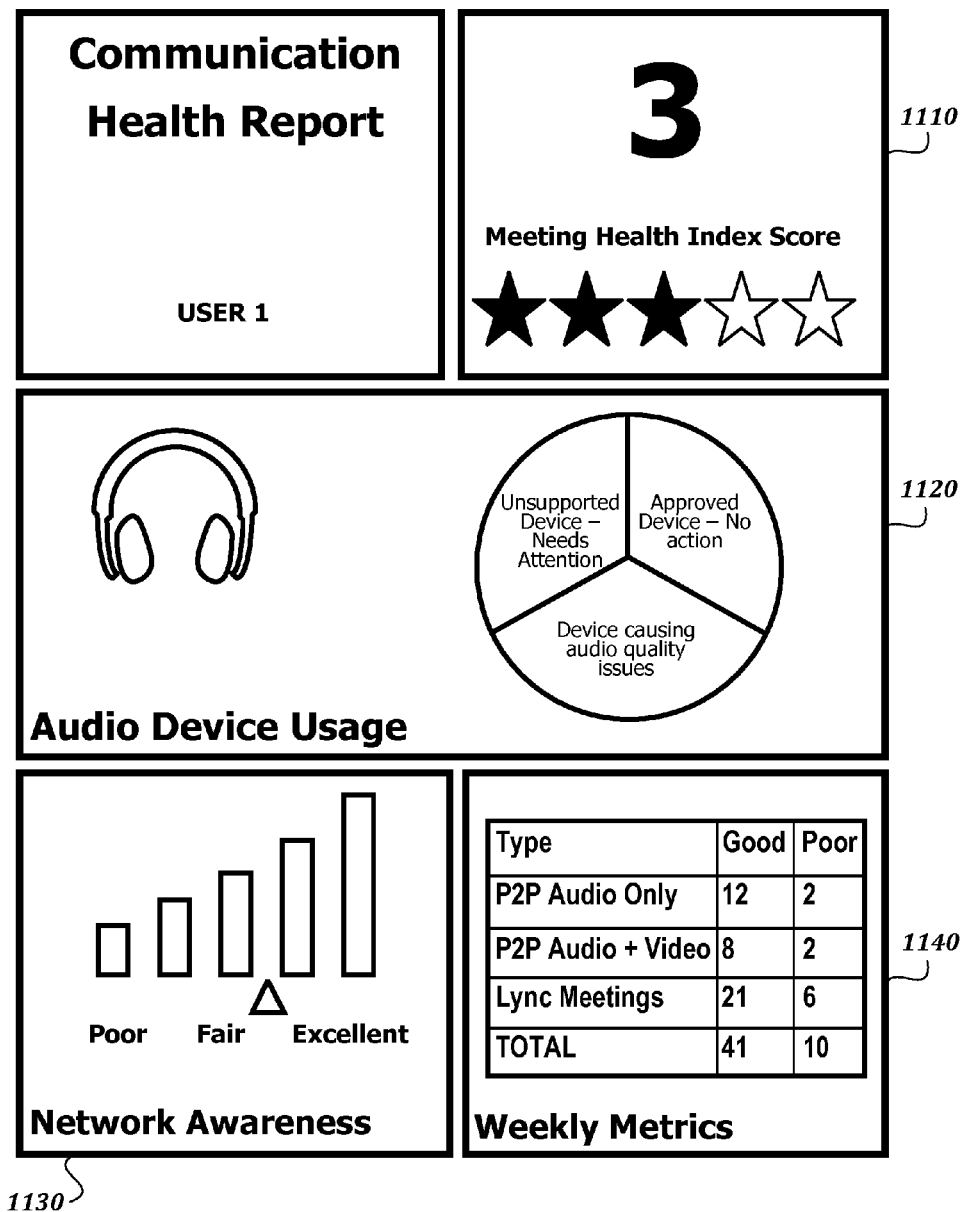
FIG. 11 is a screen shot of a main landing page titled "Communication Health Report" for a user.

FIG. 11 is a screen shot of a main landing page ("Communication Health Report") for a user ("User 1"). The main landing page also can include UC system availability, a user's open feedback items (e.g., if the user is connected to the UC system), and other messages about UC, such as training opportunities for offered UC services. The various elements shown in FIG. 11 are only examples. The elements shown in FIG. 11 can be arranged in different ways. Further, individual elements shown in FIG. 11 can be omitted, supplemented with additional elements, and/or replaced with different elements showing different information.

FIG. 11 shows a meeting health index score tile 1110. A user's meeting health index score is a composite score that includes the type of network being used when the user is communicating, the audio device being used (e.g., headset, handset, microphone, external speakers) as well as the network and device behaviors of those who participate in meetings or calls with the user. As shown, the maximum score is five stars, and the user's score for the time period (e.g., a week) is three stars. An average score (e.g., for other users within the user's organization) also can be provided to the user, but is omitted from FIG. 11. In one example scenario, the user can compare the user's individual score with the average score to get a better idea of how the user's meeting health index compares to the user's peers.

FIG. 11 also shows an audio device usage tile 1120. This tile includes a pie chart in which the fraction of calls that use approved devices and unsupported devices are shown, along with the fraction of calls in which the device being used actually caused audio quality issues.

FIG. 11 also shows a network awareness tile 1130, which can be used to rate the user's overall network usage (e.g., "poor," "fair," or "excellent") based on, for example, how often the user is participating in calls over communication channels (e.g., wireless channels) that tend to have lower voice quality.

FIG. 11 also shows a weekly metrics tile 1140 that includes counts of "good" and "poor" quality calls of different types. Alternatively, this tile can display different metrics and/or metrics for different time periods (e.g., monthly).

Example 9

Cost Saving Reports

In this example, features are described that provide a travel cost model for estimating travel cost savings based on an increase in web conferencing/online meetings. Conference travel and lost opportunity cost savings are determined based on a calculation of what the estimated cost would have been for each enterprise participant for on-site conference attendance. The model assumes that the location of the conference is the Organizer's location.

In particular, the UC data management system uses user geography information (e.g., region, country, state, and/or city) combined with a configurable travel probability matrix and associated travel and lost opportunity costs to determine cost savings. The probability of the user traveling to the physical meeting location is based on the conference attendee count and the duration of the conference, as shown in Table 9, below:

TABLE 9 probability of user traveling to a physical meeting location.

| Attendee Count Min | Attendee Count Max | % Probability based on Conference Duration | | | | |
|---|---|---|---|---|---|---|
| | | <=30 Min | <=1 Hour | <=2 Hours | <=4 Hours | >4 Hours |
| 1 | 3 | 2.0 | 2.0 | 5.0 | 20.0 | 30.0 |
| 4 | 5 | 2.0 | 3.0 | 6.0 | 25.0 | 40.0 |
| 6 | 9 | 3.0 | 4.0 | 8.0 | 30.0 | 50.0 |
| 10 | 24 | 3.0 | 6.0 | 12.0 | 37.0 | 60.0 |
| 25 | 999 | 3.0 | 9.0 | 14.0 | 40.0 | 65.0 |

An associated hourly travel and opportunity cost can be calculated based on a geographical difference (e.g., inter-region, inter-country) between the physical meeting location (which may be assumed to be the organizer's location) and the participant's location. For example, if a user in the United Kingdom is invited to a meeting in North America, the geographical difference is "inter-region," whereas if the meeting is in France, the geographical difference is "inter-country." These classifications can be adjusted, such as when a user is located in an isolated area of a large country, and inter-city travel is more expensive than for a user near a population center of a small country. Example calculations are shown in Table 10, below. The actual costs reflected in Table 10 can be adjusted. For example, costs may be increased over time as average travel costs increase. As another example, the opportunity cost of attending a meeting for a high-level executive may be significantly greater than the opportunity cost for the executive's assistant.

TABLE 10

Hourly travel and opportunity cost.

| Geographical Difference | Lost Opportunity Cost Per Hour ($US) | Travel Cost Per Hour ($US) |
|---|---|---|
| Inter-Region | 78.00 | 143.00 |
| Inter-Country | 58.00 | 96.00 |
| Inter-City | 45.00 | 50.00 |
| Inter-Building | 30.00 | 4.00 |
| Same Building | 0.00 | 0.00 |
| Dial-In/Enterprise | 0.00 | 0.00 |
| No Cost | 0.00 | 0.00 |
| Enterprise/Unknown | 45.00 | 50.00 |

Example 10

Intelligent Data Obfuscation for Protecting Privacy

In this example, a method is described for obfuscation and removal of PII (personally identifiable information) on call detail records in a configurable approach that protects privacy information but still allows for data analysis and insights.

In at least one embodiment, data obfuscation applies to all calls associated with a gateway (assumed to be PSTN calls), and the piece of data obfuscated is phone numbers. The UC data management system allows an enterprise to determine when to obfuscate data (e.g., when data is imported, or a given number of days after the call occurred). The format of the obfuscation can be, for example, as follows: +14253334444→+1425*******, where numerals represent numbers in a phone number, and * represents an obfuscated digit. The number of digits to obfuscate (e.g., by converting to *) is configurable. In the example above, a few leading digits are retained, allowing an enterprise to be able to report and group calls (e.g., by area code or zone). The UC data management system also can allow an enterprise to exclude specific phone numbers or groups of phone numbers from getting obfuscated.

B. Enhanced Monitoring for UC Services

In this section, a monitoring service is described that can help an enterprise understand how UC infrastructure is performing from an end user perspective. When described techniques and tools are used with a UC platform, the enterprise can gain the benefit of improved communications experience within and outside the enterprise by using a wide range of modalities and capabilities that were not available previously using dedicated legacy systems (such as a PBX).

UC platforms allow users to communicate over internal networks (e.g., corporate networks) and external networks (e.g., the Internet). This opens communication capabilities not only to users available at their desks, but also to users who are on the road, and even to users from different organizations. With such solutions, end users are freed from limitations of previous forms of communication, which can result in quicker and more efficient business processes and decision making.

However, the quality of communications in such platforms can be affected by a variety of problems, including software failures, hardware failures, configuration problems (e.g., system-wide or within components (e.g., firewalls, load balancers)), and network performance problems. The potential impacts of these and other problems include immediate impact upon end users (both internal and roaming) and inefficient use of functionality that increases overall costs.

Although there are some fixed costs associated with resolving an issue, there are some variable costs that can be reduced to help address the overall impact. One example of a variable cost is the time it takes for an issue to be reported and the time it takes to diagnose the problem. For example, a user may not report an issue immediately for a variety of reasons (e.g., the user may not realize that the issue is something that should be reported, may not be able to report the issue immediately, or may not know who to report to).

Another example of a variable cost is the time it takes to diagnose and resolve the problem after an issue has been reported. In some cases, such as hardware failure, it is simple to identify the root cause. In other cases, it can be difficult to diagnose the root cause of an issue, for a variety of reasons. For example, the individual carrying out the diagnosis may only have information that they receive from an end user, and such information may not be accurate, reliable, or actionable.

Another example of a variable cost is the time it takes to verify that an issue has been resolved. Issues may only exhibit themselves to individuals who are in a specific environment (e.g., connecting via the Internet), and it may not be possible for the individual that is attempting to resolve the issue to immediately verify whether a particular action has successfully resolved the issue.

Reducing variable costs can result in significant cost savings, and improving upon the processes (e.g., problem diagnosis) that can lead to increases in variable costs also can improve overall quality and user satisfaction. Accordingly, a dynamic monitoring service can add significant value to an organization.

Detailed Overview of an Example Monitoring Service

A monitoring service as described herein can include one or more of the features described with reference to Examples 11-15 below. More generally, a UC system with a comprehensive monitoring service can provide the following functionality:
- automatic, regular verification of system functionality;
- alerting individuals designated for resolving identified issues based on factors such as issue type, time of day, etc.;
- providing detailed information on the issue, including logs, traces and details of the experience an end user would see;
- providing a mechanism to automatically retry the problematic scenario and verify that the issue is resolved; and
- continued monitoring of the rest of the UC environment while the fault is being fixed, to reduce the chance of further problems.

Previous monitoring services have suffered from several drawbacks, including the need to deploy tools on a dedicated server, with associated deployment and maintenance costs; ability to detect only issues in the specific location the tools deployed, requiring the tools to be deployed in multiple locations; dependence on components such as Web reverse proxies and firewalls; and the inability of diagnosis and resolution tools to improve over time in a way that can be used by the customer directly.

The following scenario illustrates how a monitoring service can be used effectively.

Alice, a consultant working for ABC Consultants, is visiting a potential client. During negotiations, Alice realizes she needs Bob to help answer some questions and close the deal. Alice attempts to start a call with Bob using her laptop. Unfortunately, the call fails. After repeated attempts, Alice is able to connect, but the audio quality prevents any meaningful discussion with Bob. Alice is not able to close the deal in a timely manner. Later, Alice decides to report the issue, but she has to wait until she returns to the office, where she is able to look up the relevant administrator (Charlie) and report the issue.

Charlie asks Alice for as many details as possible. However, Alice did not have logging enabled on her laptop and is not possible to provide logs. Also, Alice is now able to make calls to Bob without any issues, and is not able to reproduce the problem. Charlie spends significant time to attempt to determine the root cause. During this time, Charlie receives calls from other users reporting similar problems. After a significant amount of time, and repeated trial and error, Charlie believes the problem is caused by a firewall configuration issue. Charlie makes the required update to address this configuration change, but has no reliable mechanism to verify that the update will address the issue seen by Alice and others.

Later, ABC Consultations decides to implement a monitoring service, as described herein. While Charlie is carrying out his normal tasks for the day, he receives an alert stating that the monitoring service has detected an issue which is causing calls to fail. Quickly reviewing the alert details, Charlie determines that this is a significant issue that requires immediate attention. He immediately returns to his desk where he checks his e-mail which shows he has received an e-mail alert containing the following information:
- the extent of end user impact across the enterprise;
- an indication that the fault is limited to audio connections and that IM conversations are working normally;
- logs that allow him to see both detailed and high-level information and compare this information to "last known good" information such as transaction time;
- a list of potential causes of the issue based on historical data, including number of times this issue has been discovered; and
- a link which allows him to utilize the service to replicate the failure that was previously detected.

Using the information that is made available within this e-mail, Charlie is able to diagnose the root cause quickly. After making the required update to the firewall configuration, Charlie is able to utilize the appropriate link within the e-mail to retry the problematic scenario and verify the fix. Once verified, Charlie visits a service portal and enters details of the root cause to help identify solutions for future similar issues, thereby adding to the knowledge base of the enterprise around this specific issue. Charlie is able to tell users that the issue had been identified previously and has been resolved.

Charlie works with the firewall administrator to ensure that the monitoring service is used to verify that firewall changes have not accidentally caused any new issues. By using this "run now" mechanism, unintended impacts can be identified immediately and not cascade into a lengthy outage for end users.

Depending on implementation, the monitoring service can be used monitor a variety communications, including one or more of the following:
- login to the UC infrastructure;
- set the users presence, and obtain presence for the users contacts;
- send and receive internal IMs;
- start and receive incoming P2P audio calls, with audio of acceptable quality;
- schedule/invite users to/join a conference, with audio of acceptable quality;
- send and receive conference data, such as shared whiteboards and application data;
- manage conference participants;
- dial and connect to standard telephones at various locations, with acceptable quality;
- receive calls from standard telephones various locations, with acceptable quality;
- forward and receive calls by unified messaging service, with acceptable quality;
- receive voicemail from roaming users, federated users, or standard telephone users;
- set local presence and receive presence information from an external IM service;
- send and receive IM via an external IM service;
- set local presence and receive presence information from a federated contact;
- send IMs to and receive IMs from a federated contact;

join and participate in conference as an anonymous user, with acceptable quality;

receive calls (including from RGS numbers) at standard telephones, with acceptable quality (RGS (Response Group Service) is an Automatic Call Distributor (ACD) feature of Microsoft Lync Server, and is similar to a small helpdesk application or reception desk capability, where customers, as an example, call the company number, are prompted for which department they wish to talk to, and are routed to a company employee in that department or receive a basic message if the call is occurring when no one is available (e.g., after business hours);

call from standard telephones (including calling unassigned numbers, and receiving associated announcements);

check for and download software updates at client devices;

download client software for participating in meetings;

park and retrieve calls;

access Web-based services; and join group chats, send and receive group chat information, participate in group chat across federated boundaries.

A monitoring service can be deployed externally (outside an organization's network) or internally (on a server inside an organization's network). Although an external service that supports the end user scenarios described above is likely to discover many issues that are impacting internal end users, other cases may not be detected. To address these situations, an enterprise can deploy an internal monitoring service on a server inside the corporate network. This internal server could synch with an external monitoring service, which can reduce setup and maintenance costs, and have one location at which to configure settings and receive alerts and reports.

Having a monitoring service on an internal server can have additional advantages. For example, the ability to actually detect if gateways are up and running, even if load balanced, can only be carried out completely with an internal server. In addition, being able to completely inspect configuration information and/or access logs can only be carried out with internal servers.

In addition to handing end user scenarios that apply for roaming users and internal users, examples of validation that can be carried out using an internal server include the following:

inspecting deployment configuration information and looking for anomalies (e.g., immediate impacts or minor impacts that grow over time);

inspecting CDRs for potential trends and issues;

inspecting a QoE database for potential trends and issues;

validating the range and number of gateways that are available and working correctly; and validating version information of gateway firmware and providing alerts to an administrator if versions are out of date and need to be patched.

Stress Testing:

One of the key issues for an organization is determining how many users the system can handle. The monitoring service can provide administrators with the ability to not only test specific modalities, but to utilize a mix of these modalities and stress test the environment.

Table 11, below, includes a list of features that can be included in a monitoring service. Depending on implementation, a monitoring service may include more features, fewer features, or features that differ from those that are listed in Table 11.

TABLE 11

Example monitoring service features

| Feature | Description |
| --- | --- |
| Web Experience | This is a web site that an admin can visit. On this site, the admin can learn about the service, see tutorials, etc., and sign up for the service. When signing up, the admin can create an account (including billing information), and specify details about the end user services required. |
| Service Configuration | Once an admin has signed up, and periodically throughout the lifetime of utilizing the service, the admin can specify details about their deployment, which is stored in a secure manner. This specification can occur in several ways, e.g.:<br>Admin utilizes the web experience of the service to view and modify details about their deployment.<br>Admin utilizes a tool that when used in their deployment automatically detects changes, and provides these to the service.<br>In addition to specifying details about the admin's deployment, the admin can also configure details such as the following:<br>Determine end user services and identities within the enterprise that are to be used (e.g., validate the IM user experience using two identities - service1 and service2, which are deployed on two different pools).<br>Determine frequency of end user experience verification (e.g. every 5 minutes).<br>Determine what thresholds are acceptable to the deployment (e.g., acceptable for a single IM to fail, but not when 5 fail in an hour).<br>Provide prioritized list of who should be alerted, and how, when an issue has been discovered.<br>Inform the service when it is expected that issues should occur. For example, when a server is being patched (maintenance mode), then it is likely that more issues will arise.<br>Make configuration changes and carry out test for each of the available end user experiences, in order to ensure that the configuration specified is accurate, and to allow the admin to verify any deployment changes and validate any issue resolutions. |

TABLE 11-continued

Example monitoring service features

| Feature | Description |
| --- | --- |
| Alerting Mechanism | Make alerts available using current mechanisms that the admin may utilize (such as SCOM, Tivoli and Openview).<br>Provide a web portal view of the service alerts.<br>Allow admin to be notified via other modalities, such as SMS, IM, e-mail, or interactive voice response (IVR) alerts.<br>Confirm receipt of alerts, and if not confirmed, send alerts to a secondary set of recipients.<br>Provide an incident log portal (identified by a unique ID in an alert), which provides more detailed view of the incident, including a summary of the issue, details of the logs, potential causes, and any previous solutions associated with that specific deployment.<br>Provide access to community resources (e.g., FAQs, channels for real-time communication between multiple admins).<br>Allow admin to re-try the problematic service and verify a fix. |
| Reporting | Report metrics per end user service.<br>Report metrics for specific geographies.<br>Report metrics for a specific SIP URI.<br>Report on effects/costs of outages.<br>Compare deployment-specific information to an anonymized report from other enterprises.<br>Export relevant data reports and integrate into other enterprise-specific reports. |

The following examples illustrate some of the key features relating to the techniques and tools described herein for enhanced monitoring of performance of UC services.

Example 11

Cloud-Based Monitoring for Communication Service Availability

Cloud-hosted mechanisms are described for simulating end user real time communications to assess communication service availability or conditions. Resolution mechanisms for specific problems also are described.

Figure 12:
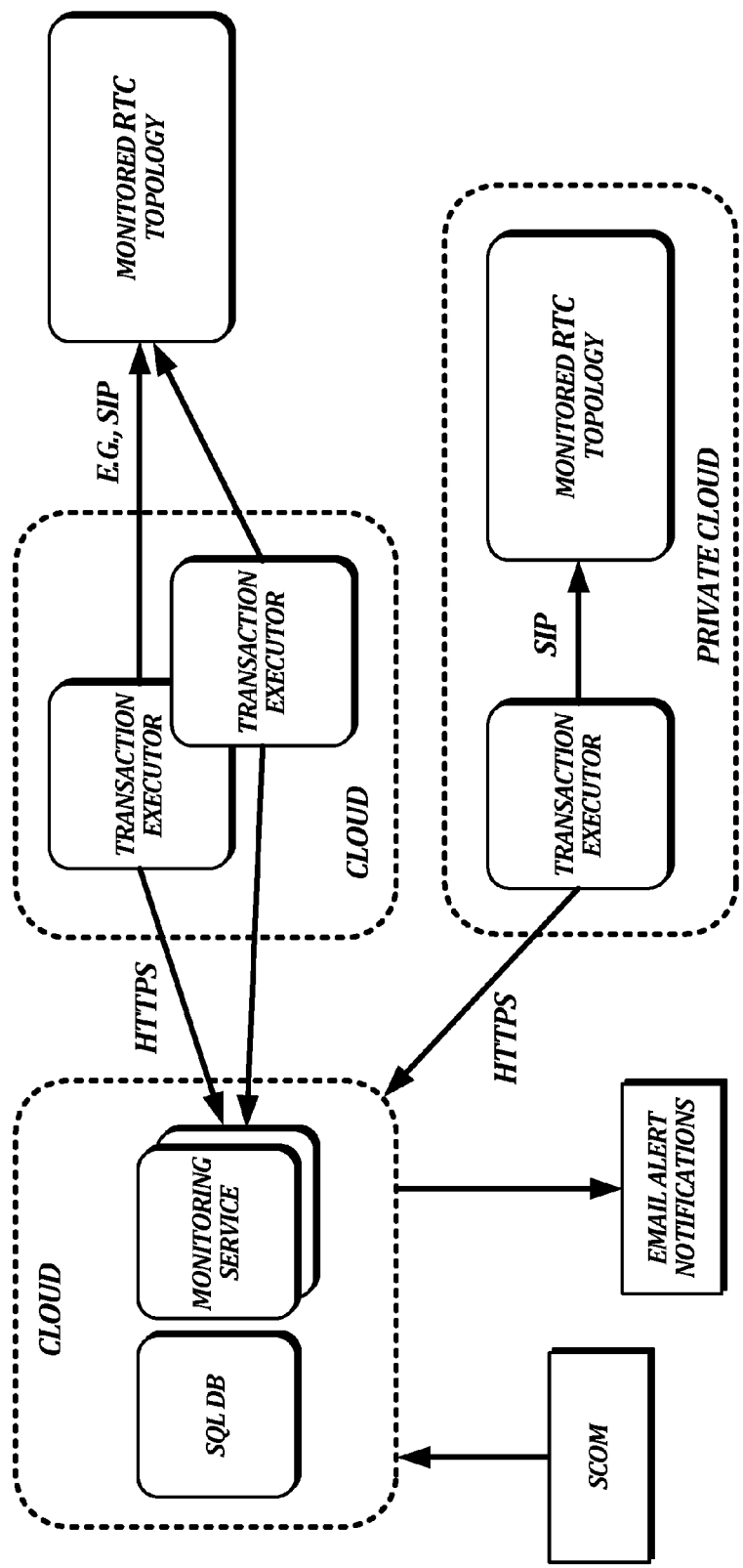
FIG. 12 illustrates a distributed real-time communications (RTC) monitoring system comprising a monitoring service, a cloud database, and transaction executors (agents)

In this example (illustrated in FIG. 12) a distributed real-time communications (RTC) monitoring system comprises a monitoring service, a cloud database (e.g., a SQL database), and transaction executors (agents). The system illustrated in FIG. 12 is highly scalable; there is no limitation on the number of monitoring service instances or the number of agents to be deployed. Agents can be deployed in various geographical locations (e.g. EMEA (Europe/Middle East/Africa), North America, APAC (Asia-Pacific)) so that real-life communication scenarios of a global organization can be appropriately represented. More agents can be deployed in a private cloud (illustrated in FIG. 12) of the organization and leverage additional synergies with their-real time communications system. The various components shown in FIG. 12 can communicate securely with one another (e.g., via HTTPS).

Each agent executes tasks (known as synthetic transactions) which mimic RTC end user behavior (e.g., conference dial-in). Synthetic transaction results are processed by the monitoring service and stored in the cloud database, and appropriate alerts are raised in case of failures. Alerts can include not only diagnostics related information, but also potential root causes and resolution steps, which are extracted from the knowledge base based on historical results.

Example 12

Algorithm for Distributing Tasks Among Geo-Distributed Agents

In this example, a scheduling algorithm is described that takes a rule schedule (e.g., rule every 15 minutes), puts it in a queue, and assigns it to an agent (also referred to as a transaction executor or TxExecutor) for execution, while considering associated load balancing and resource utilization patterns.

In at least one embodiment, to solve the task distribution problem a scheduling mechanism is configured to:
    periodically generate tasks at the defined intervals;
    make tasks available for geo-distributed agents;
    stay resilient to increased\decreased numbers of agents;
    balance workload between agents; and
    ensure parallel-executed RTC scenarios are not affecting each other or final results.

Conceptually, task scheduling and distribution can be broken into three parts (task scheduling, task distribution, and load balancing), which are discussed below in more detail:

a. Task Scheduling

In this example, the monitoring service generates tasks based on a rule definition (task template). Each task defines an end user RTC scenario executed in a specified geographical location. Tasks are generated periodically for each rule, with a defined scheduling interval (e.g., every N minutes). Newly generated tasks are added to a task queue.

b. Task Distribution

In this example, each agent is deployed in a particular geographical location in the cloud and is responsible for simulating end users in that region. After an agent is started, it executes a REGISTER operation and sends its configuration to the monitoring service. The configuration includes agent characteristics (e.g., deployment location) and capabilities (e.g., ability to execute certain tasks, maximum number of tasks to run in parallel, etc.). In response, the monitoring service sends a unique agent ID. The agent is then considered to be registered and can start executing tasks. The registered agent regularly polls the monitoring service for new tasks. The monitoring service, based on the agent's unique ID, looks up its characteristics and capabilities and sends back an appropriate task to be executed.

c. Load Balancing and Optimizations

Even if a number of agents can be scaled up and down, it is important to use resources wisely and try to distribute work load more or less equally over time. Time slots with the highest number of rules running in parallel will dictate requirements for computing resources.

In this example, a rule-load balancing algorithm is responsible for enforcing a "least maximum" of rules to be executed concurrently at the same time slot. Accordingly, in this example, when a new periodically executed rule is added to the system, the rule-load balancing algorithm does the following:

(a) for a rule which is executed every N minutes, select the set of time slots starting at minute 1;

(b) within this set, identify the time slot which has the highest number of concurrent rules;

(c) if the value of this slot is smaller than the "least maximum" which has been identified so far, then that value becomes the new "least maximum" and the set of time slots becomes the set having the "least maximum"; and (d) repeat steps (a)-(c) above until minute N−1.

Figure 13:
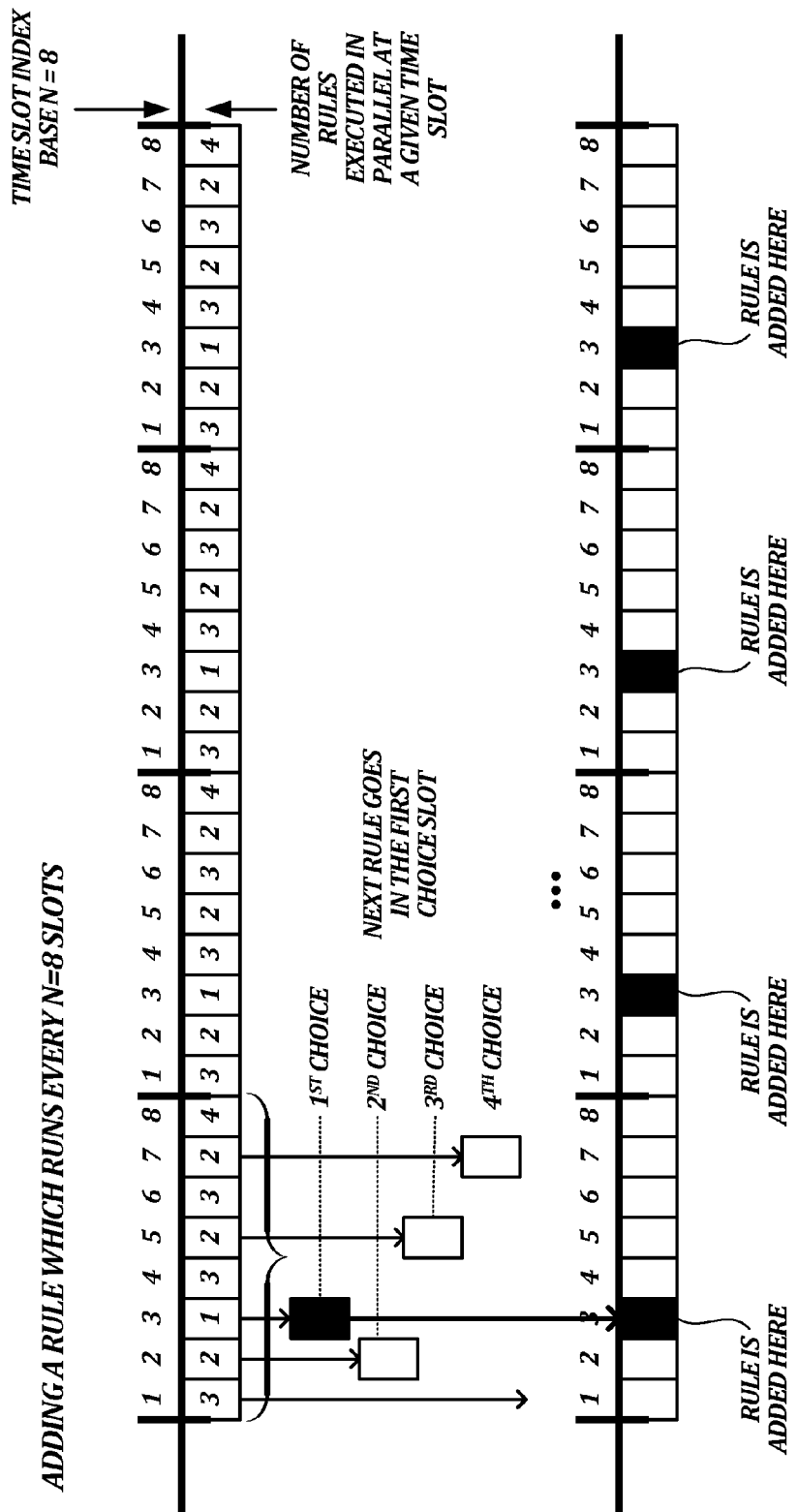
FIG. 13 illustrates a version of a rule-load balancing algorithm.

The new rule is added to the set of time slots, which has the least maximum number of rules executed at the same time. FIG. 13 illustrates a version of the algorithm in which a rule which runs every 8 slots (N=8) is added to time slot where only 1 rule is being executed, compared to other time slots in which 2 or more rules are executed in parallel. The 1-rule time slot (time slot index 3) is therefore indicated as being the "first choice" time slot. Time slots in which 2 rules are executed in parallel are indicated as being "second choice," "third choice," and "fourth choice," respectively. FIG. 13 also illustrates where the new rule is added in the sequence. In this example, the new rule is added at time slot index 3.

Additional constraints related to RTC specifics could be added to the algorithm. One of these is endpoint MPOP (multiple points of presence) prevention. Since the same RTC accounts could be used to simulate multiple end user behaviors, it is important that scenarios running at the same time are not interfering. An MPOP constraint makes sure that only one endpoint of a given account is running at the same time slot.

The check of accounts used in the rules at a given time slot could be performed before rule load balancing algorithm starts examining a current time slot set for a least maximum.

Example 13

Aggregation of "Peer" Data for Communications System Availability

In this example, benchmarking of availability information is described. Benchmarking can be based on statistical availability, and can be based on "peer group" or industry verticals.

For customers running similar scenarios on the same agents, historical information could be used for comparison and benchmarking of their RTC systems. Benchmarking of availability information, audio quality, etc., can be carried out. Benchmarking can be based on statistical availability (e.g., based on "peer group," industry verticals, etc.).

Figure 14:
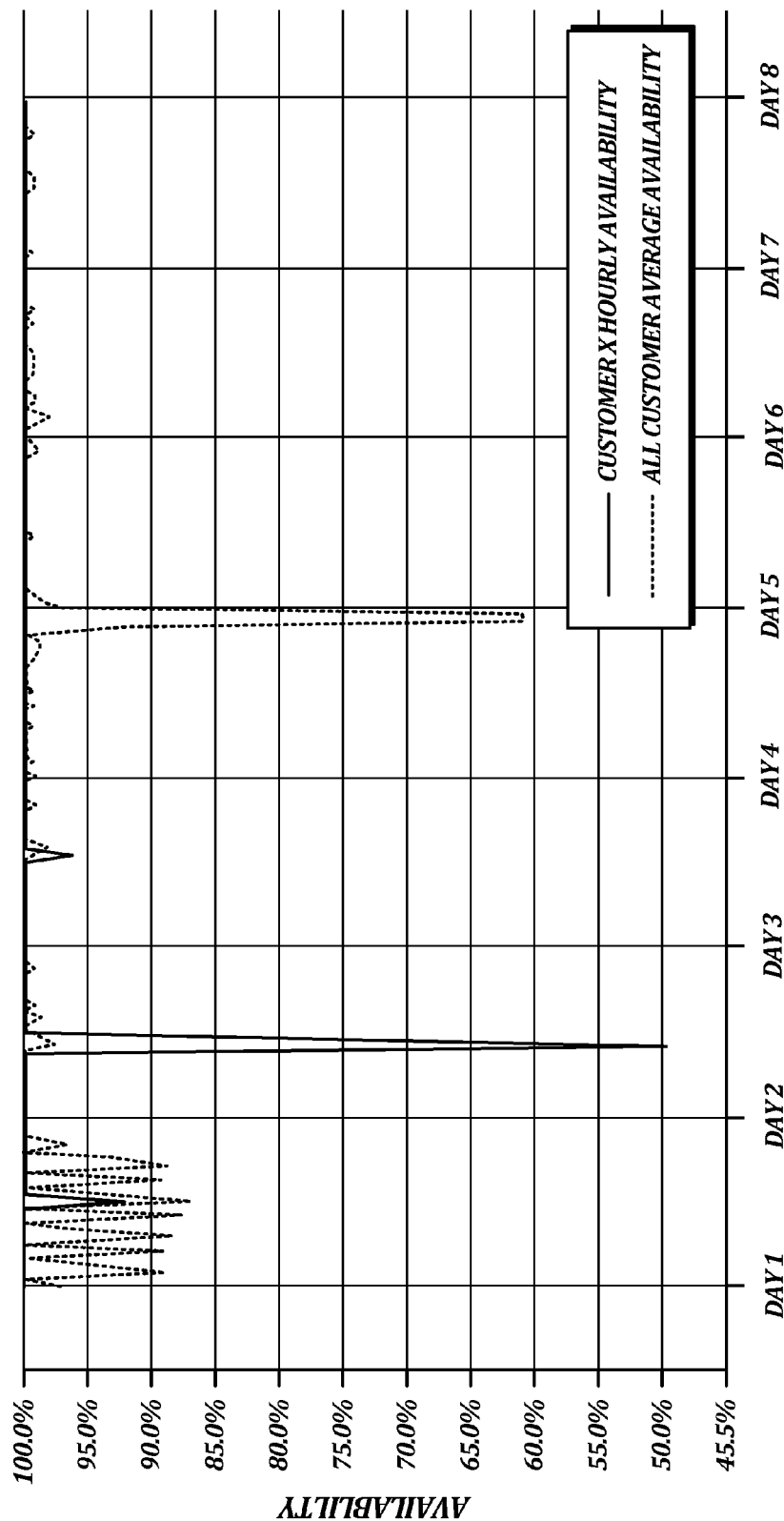
FIG. 14 is a graph that illustrates a customer's availability and an average availability for all customers.

For example, FIG. 14 illustrates a customer's availability ("Customer X") with a solid line and illustrates average availability for all customers with a dashed line. Comparison of these two lines can provide valuable information about Customer X's availability. For example, during Day 2 a slight drop in average availability (to about 98%) coincides with a very large drop in availability (to about 50%) for Customer X. On the other hand, Customer X's drop in availability (to about 60%) at the end of Day 4 is shown to be about the same as the average for all customers.

Example 14

Voice Quality Metrics Based on Synthetic Transactions

In this example, voice quality metrics (packet loss, jitter, latency, etc.) are collected for voice-related synthetic transactions (e.g., conference dial-in). This data can be used for raising immediate alerts or discovering audio quality degradation patterns while mining historical data.

Figure 15:
FIG. 15 shows an alert generated by a monitoring service.

For example, FIG. 15 shows an alert generated by a monitoring service ("PowerMon") for a low MOS score. The alert provides a date and time and a descriptive name for the event ("APAC—US Inbound: user07→user01"). The descriptive name includes information such as region ("APAC—US"), caller ("user07"), and callee ("user01"). The alert also provides details (including NMOS scores) for the caller and the callee. The alert also includes a table for reporting packet loss, jitter, latency, and degradation for inbound and outbound streams.

Example 15

Global Knowledge Base

In this example, a monitoring service maintains a global knowledge base with data related to RTC system availability disruption investigations. In this way, future RTC system availability issues can be solved faster because potential root causes and resolution steps are automatically provided.

In one scenario, after executing a task, an agent sends results to the monitoring service. In case of a task failure, the result contains multiple parameters (e.g., execution step, diagnostics code, exception type, SIP code, etc.) describing the failure. The monitoring service uses this set of parameters to classify given failures into buckets. Possible root causes and resolution steps can be entered into system and mapped to the set of parameters (e.g., a particular bucket) after issue investigation. This data immediately becomes available for the classification and investigation of future RTC system availability issues.

C. User Survey Service

In this section, a user survey service is described that can help an enterprise to obtain information directly from users. For example, the user survey service can be used to obtain information from users about the performance of UC services.

Detailed Overview of an Example User Survey Service

A user survey service as described herein can include one or more of the features described with reference to Example 16 below. In a broader UC context, a UC system with a comprehensive user survey service can provide at least the following functionality.

By contacting a user proactively through the UC system, the end user does not have to authenticate towards the system. Information is automatically collected within the context of a given user, without the need to have that user enter a password or visit a URL with a specific encoded access key.

A UC system can provide the user survey service the end user's presence information, and the user survey service can target users based on their availability. Therefore, users can be contacted specifically at a time when they are available, and not be disturbed while they are busy. This should increase the possibility of the user actually completing the survey, as opposed to surveys conducted by e-mail.

By reacting to presence information, the user survey service can reach users when they become available. To some users, an immediate request to complete a survey after becoming available may be seen as intrusive. The user survey service can be configured to wait for the duration of a "cooling off" period (e.g., a few minutes) after the user becomes available.

The user survey service can track how often individual users are contacted and asked to take a survey. The service can be configured to reduce or stop survey requests when certain conditions are present or certain thresholds are reached. For example, the service can be configured to request a user's participation a maximum of 10 times. As another example, once a user has taken a survey, the service does not contact the user again regarding that survey.

Utilizing instant messaging, an inherently stateful communication channel, it is possible for an end user to quit a survey without finishing it. The user survey service can recognize this and allow the user to automatically pick up where the user left off when contacting the user again in order to finish the survey.

Useful surveys can be completed in less than a minute, and in some cases, in as little as a few seconds. This can make users more likely to respond to surveys in the future, increasing the overall response rate (compared to lengthy and disruptive e-mail surveys).

The following examples illustrate some representative features of a user survey service, according one or more embodiments of the present disclosure.

Example 16

Using Presence Information to Survey Users

In this example, a user survey service provides an increased number and higher quality of responses to end user surveys by utilizing real-time communication information. After determining if a user is available (e.g., online and involved in a meeting or other activity) based on presence information, the user survey service initiates a survey at that time via a real-time communication mechanism (e.g., instant messaging). The real-time communication is typically more immediate than other communications (e.g., e-mail) and generally increases the chance that the user will respond to the survey.

Figure 16:
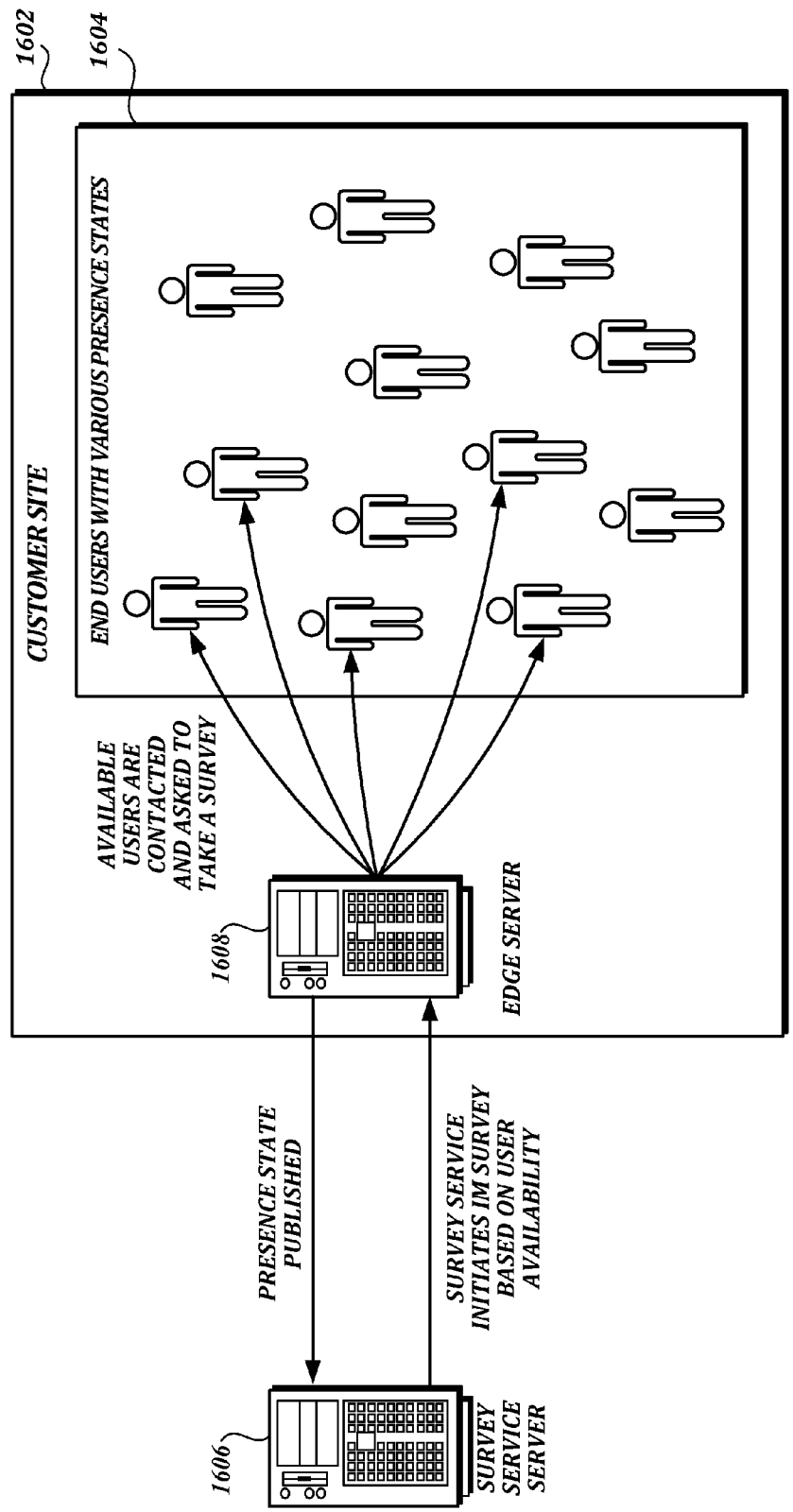
FIG. 16 is a diagram of a UC system that includes a user survey service.

FIG. 16 is a diagram of a UC system that includes a user survey service. As shown in FIG. 16, the UC system includes a survey service server 1606 that communicates with devices associated with a customer site 1602 (e.g., edge server 1608 and user devices associated with a set of end users 1604). (The users/devices that are shown as being within the box in FIG. 16 that represents the customer site 1602 need not be physically present at the customer site 1602, but may be connected to a network associated with the customer site 1602.) As shown in FIG. 16, the edge server 1608 (e.g., a Lync edge server) publishes presence information to the survey service server 1606, which initiates a survey (e.g., via instant messages (IMs)) via the edge server 1608 based on user availability as indicated by the presence information. The edge server 1608 is only one example of a possible deployment choice in a UC system; other servers with different functionality and configurations also may be used.

The survey service server can obtain presence information in different ways. For example, a user may be signed in to an application that is trusted by the UC system, or the user's presence can be detected and authenticated when the user signs in to a user account, even if the user is not currently using a trusted application.

In this example, users that are determined to be available (indicated by curved arrows) are contacted by IM and asked to complete a survey. Users that are determined to be unavailable (e.g., offline, online but busy, etc.) are not contacted by IM. Users that are not available can be excluded from the survey, or their participation can be requested in some other way (e.g., via e-mail).

Figure 17:
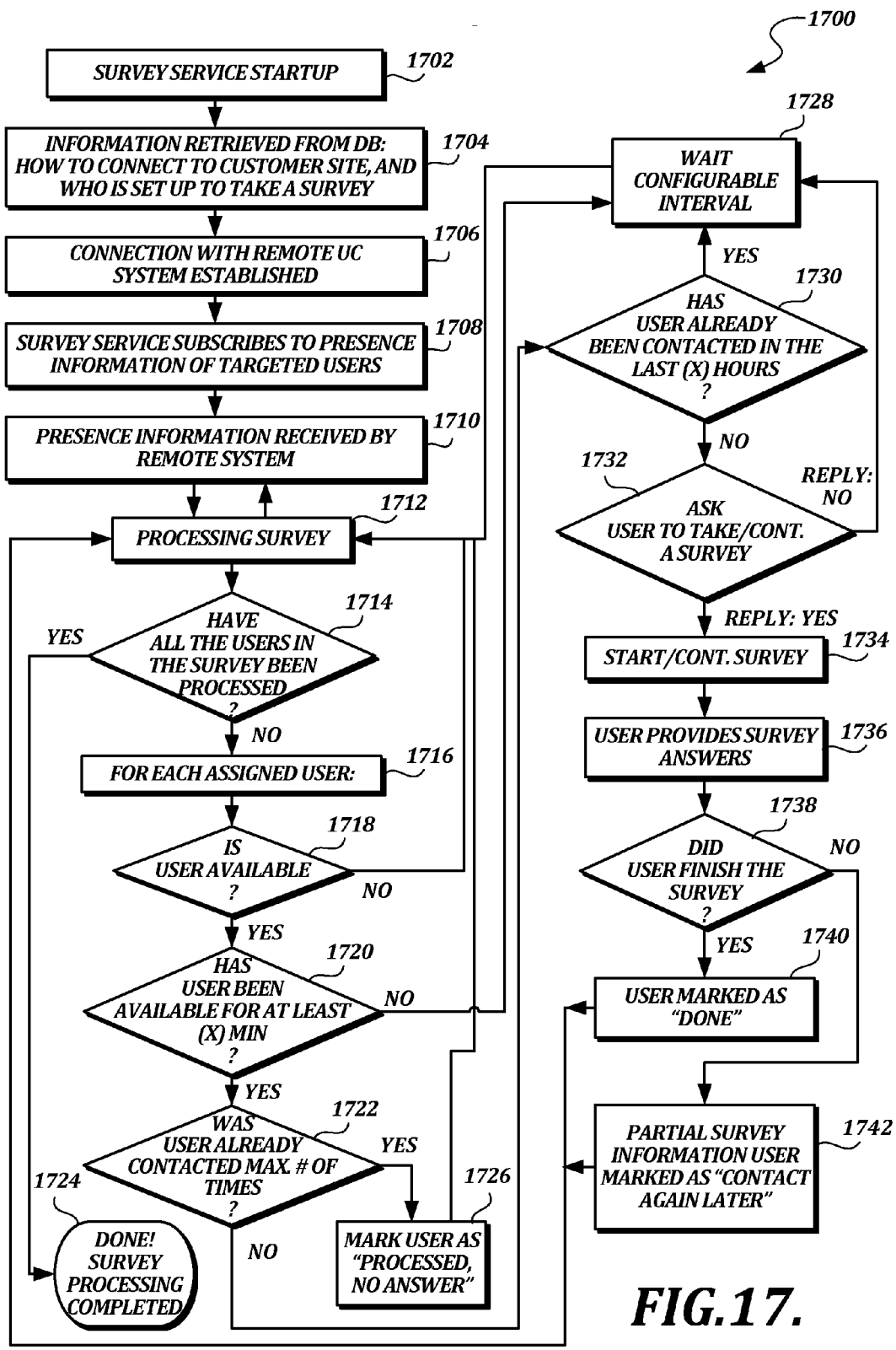
FIG. 17 is a flow chart that illustrates a survey technique that employs presence information.

FIG. 17 is a flow chart that illustrates a survey technique that employs presence information. The technique shown in FIG. 17 can be implemented by the system shown in FIG. 16, or by some other system. In step 1702, a survey service starts up. In step 1704, the service retrieves information (e.g., how to connect to a customer site, and which users associated with the customer site are configured to take surveys) from a database. The service establishes a connection with the remote UC system (e.g., a Lync system) at step 1706, and subscribes to presence information of targeted users in step 1708. The service receives the presence information in step 1710 and begins processing the survey in step 1712. As indicated in step 1714, the service continues processing the survey until all survey processing is completed (see step 1724). In step 1716, the service processes an assigned user. In step 1718, the service determines if the user is available, and returns to step 1714 if not. If the user is available, the service determines if the user has been available for a configurable number of minutes in step 1720, as a "cooling off" period to avoid disturbing a user that has just finished a call, for example. (The service can wait for the configurable interval to elapse in step 1728, if needed, and continue processing for other users, as appropriate.) If the user has been available for the required period of time, the service determines, in step 1722, if a threshold number of attempts to contact the user has been reached. If the threshold has been reached, the user is marked as "processed, no answer" in step 1726. If the threshold has not been reached, the service determines, in step 1730, whether the user has already been contacted within a configurable number of hours, to avoid pestering a user that has been recently contacted. (The service can wait for the configurable interval for this user to elapse in step 1728, if needed, and continue processing for other users, as appropriate.) If the user has not been contacted within the configurable number of hours, the service contacts the user (e.g., via IM) to ask the user to take a survey (or to continue a survey if the user has previously started a survey) in step 1732.

In this example, the user can reply positively (e.g., "yes" or some other positive response, such as "start survey") or negatively (e.g., "no" or some other negative response; a failure to reply within a given amount of time may be interpreted as a negative response). If the user's reply is negative, the service can wait for a configurable interval in step 1728 before attempting to contact the user again. Alternatively, the user may be given more options, such as "contact me later" or "do not contact me again." If the user chooses not to be contacted again, the service can skip step 1728 and process another user, as appropriate.

If the user's reply is positive, the service starts or continues the survey, as appropriate, in step 1734, and the user provides survey responses in step 1736. In step 1738, the service determines whether the survey has been completed. If so, the user is marked as "done" in step 1740, and processing of the survey continues with additional users, as appropriate. If the survey has not been completed, the service marks the user as "contact again later" in step 1742. (The service can wait for the configurable interval for this user to elapse in step 1728, if needed, and continue processing for other users in the meantime, as appropriate.)

Many alternatives to the technique shown in FIG. 17 are possible. Various processing steps can be omitted, or the steps shown in FIG. 17 can be supplemented or replaced with other steps. For example, a survey service can omit the "cooling off" period after a user becomes available. As another example, for an important survey that requires participation from a particular user, the service can omit the option of not contacting the user again after a threshold number of attempts have occurred, and instead continue to contact the user until the survey is completed.

D. Operating Environment

In any of the examples described herein, client devices and administrator devices may be any suitable computing devices, including, but not limited to, laptop computers, desktop computers, smart phones, tablet computers, and/or the like. Servers may include suitable computing devices configured to provide services described in further detail below. As used herein in the context of a server-client relationship, the term "server" refers generally to a computing device that provides information (e.g., video and audio data) and/or services to other devices over a communication link (e.g., a network connection), and is not limited to any particular device configuration. Servers may include one or more suitable devices, such as dedicated server computing devices, or virtualized computing instances or application objects executing on a computing device. The term "client" can be used to refer to a computing device (e.g., a client device, an administrator device) that obtains information and/or accesses services provided by a server over a communication link, and is not limited to any particular device configuration. However, the designation of a particular device as a client device does not necessarily imply or require the presence of a server. At various times, a single device may act as a server, a client, a server and a client, or neither, depending on context and configuration. Actual physical locations of clients and servers are not necessarily important, but the locations can be described as "local" for a client and "remote" for a server to illustrate a common usage scenario in which a client is receiving information provided by a server at a remote location.

Figure 18:
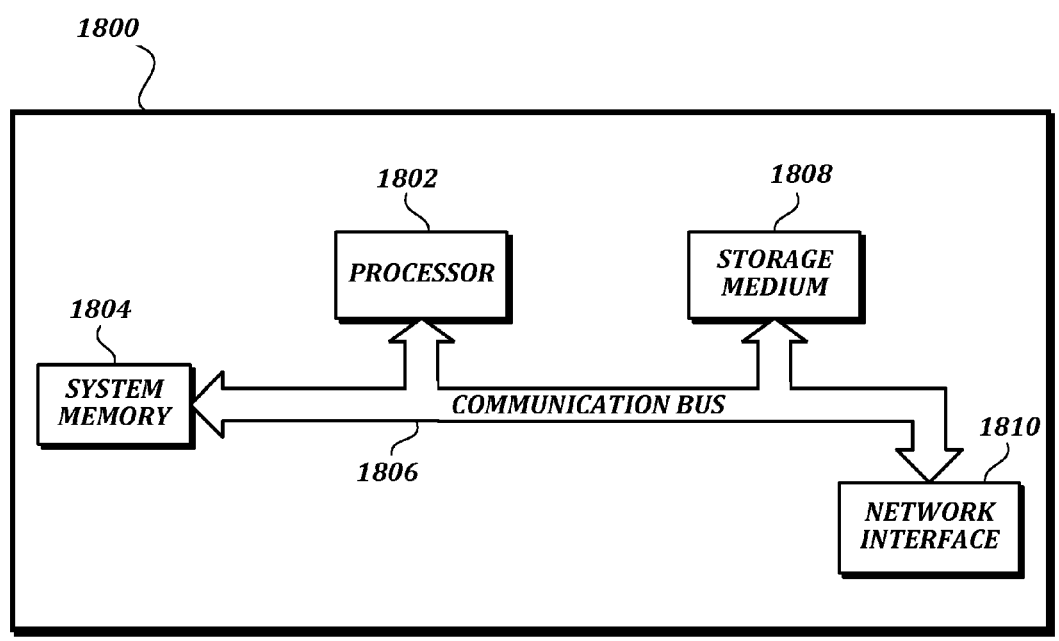
FIG. 18 is a block diagram that illustrates aspects of an exemplary computing device appropriate for use in accordance with embodiments of the present disclosure.

FIG. 18 is a block diagram that illustrates aspects of an exemplary computing device 1800 appropriate for use in accordance with embodiments of the present disclosure. The description below is applicable to servers, personal computers, mobile phones, smart phones, tablet computers, embedded computing devices, and other currently available or yet-to-be-developed devices that may be used in accordance with embodiments of the present disclosure.

In its most basic configuration, the computing device 1800 includes at least one processor 1802 and a system memory 1804 connected by a communication bus 1806. Depending on the exact configuration and type of device, the system memory 1804 may be volatile or nonvolatile memory, such as read only memory ("ROM"), random access memory ("RAM"), EEPROM, flash memory, or other memory technology. Those of ordinary skill in the art and others will recognize that system memory 1804 typically stores data and/or program modules that are immediately accessible to and/or currently being operated on by the processor 1802. In this regard, the processor 1802 may serve as a computational center of the computing device 1800 by supporting the execution of instructions.

As further illustrated in FIG. 18, the computing device 1800 may include a network interface 1810 comprising one or more components for communicating with other devices over a network. Embodiments of the present disclosure may access basic services that utilize the network interface 1810 to perform communications using common network protocols. The network interface 1810 may also include a wireless network interface configured to communicate via one or more wireless communication protocols, such as WiFi, 2G, 3G, 4G, LTE, WiMAX, Bluetooth, and/or the like.

In the exemplary embodiment depicted in FIG. 18, the computing device 1800 also includes a storage medium 1808. However, services may be accessed using a computing device that does not include means for persisting data to a local storage medium. Therefore, the storage medium 1808 depicted in FIG. 18 is optional. In any event, the storage medium 1808 may be volatile or nonvolatile, removable or nonremovable, implemented using any technology capable of storing information such as, but not limited to, a hard drive, solid state drive, CD-ROM, DVD, or other disk storage, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 1804 and storage medium 1808 depicted in FIG. 18 are examples of computer-readable media.

For ease of illustration and because it is not important for an understanding of the claimed subject matter, FIG. 18 does not show some of the typical components of many computing devices. In this regard, the computing device 1800 may include input devices, such as a keyboard, keypad, mouse, trackball, microphone, video camera, touchpad, touchscreen, stylus, and/or the like. Such input devices may be coupled to the computing device 1800 by wired or wireless connections including RF, infrared, serial, parallel, Bluetooth, USB, or other suitable connections protocols using wireless or physical connections.

In any of the described examples, data can be captured by input devices and transmitted or stored for future processing. The processing may include encoding data streams, which can be subsequently decoded for presentation by output devices. Media data can be captured by multimedia input devices and stored by saving media data streams as files on a computer-readable storage medium (e.g., in memory or persistent storage on a client device, server, administrator device, or some other device). Multimedia input devices may include a video camera. A video camera, when active, may provide a stream of video data. As another example, multimedia input devices may include a microphone. A microphone, when active, may provide a stream of audio data. Input devices can be separate from and communicatively coupled to computing device 1800 (e.g., a client device), or can be integral components of the computing device 1800. In some embodiments, multiple input devices may be combined into a single, multifunction input device (e.g., a video camera with an integrated microphone). Any suitable input device either currently known or developed in the future may be used with described systems described herein.

The computing device 1800 may also include output devices such as a display, speakers, printer, etc. The output devices may include video output devices such as a display or touchscreen. The output devices also may include audio output devices such as external speakers or earphones. The output devices can be separate from and communicatively coupled to the computing device 1800, or can be integral components of the computing device 1800. In some embodiments, multiple output devices may be combined into a single device (e.g., a display with built-in speakers). Any suitable output device either currently known or developed in the future may be used with described systems.

In any of the described examples, digital signal processors (which can be implemented in hardware, software, or some combination of hardware and software) can be used for processing media data such as audio data and video data. For example, a digital signal processing module can include encoders to encode and/or decoders to decode encoded data in formats such as MP3, Vorbis, AAC, HE-AAC, or Windows Media Audio (WMA) for audio, or MPEG-2/H.262, H.263, VC-1, or H.264 for video.

In general, functionality of computing devices described herein may be implemented in computing logic embodied in hardware or software instructions, which can be written in a programming language, such as C, C++, COBOL, JAVA™, PHP, Perl, HTML, CSS, JavaScript, VBScript, ASPX, Microsoft .NET™ languages such as C#, and/or the like. Computing logic may be compiled into executable programs or written in interpreted programming languages. Generally, functionality described herein can be implemented as logic modules that can be duplicated to provide greater processing capability, merged with other modules, or divided into sub-modules. The computing logic can be stored in any type of computer-readable medium (e.g., a non-transitory medium such as a storage medium) or computer storage device and be stored on and executed by one or more general-purpose or special-purpose processors, thus creating a special-purpose computing device configured to provide functionality described herein.

E. Extensions and Alternatives

Many alternatives to the described systems are possible. For example, although only a single client device and administrator device are shown in FIG. 2 for ease of illustration, the described systems can comprise multiple client devices and administrator devices, which can interact with the system one at a time or simultaneously.

Many alternatives to the illustrated techniques are possible. For example, processing stages in techniques described herein can be separated into additional stages or combined into fewer stages. As another example, processing stages in techniques described herein can be omitted or supplemented with other techniques or processing stages. As another example, processing stages illustrated as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

F. Illustrative Embodiments

The present disclosure includes descriptions of various aspects of unified communication (UC) systems, including UC management and analysis systems and related tools and techniques. Described systems, tools, and techniques are adapted for enhanced UC data capture, analysis, and reporting; enhanced UC monitoring services; and a user survey service that can be used for conducting user surveys related to UC services.

Embodiments disclosed herein include:

A computer-implemented method for performing one or more of the above-described techniques.

A server computer comprising a processing unit and computer-readable storage media having stored thereon computer-executable instructions configured to cause the server computer to perform one or more of the above-described techniques.

A computer-readable storage medium having stored thereon computer-executable instructions configured to cause a computing device to perform one or more of the above-described techniques.

A computer system comprising a server that provides one or more of the above-described unified communication services. The computer system may further comprise plural client computing devices and an administrator computing service.

An administrator computing device in communication with a server that provides one or more of the above-described unified communication services, the administrator computing device comprising a processing unit and computer-readable storage media having stored thereon computer-executable instructions configured to cause the administrator computing device to perform one or more of the above-described techniques.

A client computing device in communication with a server that provides one or more of the above-described unified communication services, the client computing device comprising a processing unit and computer-readable storage media having stored thereon computer-executable instructions configured to cause the client computing device to perform one or more of the above-described techniques.

While illustrative embodiments have been illustrated and described, it will be appreciated that various changes can be made therein without departing from the spirit and scope of the claimed subject matter.

The embodiments of the invention in which an exclusive property or privilege is claimed are defined as follow:

1. A non-transitory computer-readable medium having computer-executable instructions stored thereon that, when executed, cause a computer system to:
   (a) rate audio call quality by evaluation of one or more quality metrics for a set of calls against a defined set of one or more threshold values;
   (b) determine site/time interval combinations for calls in the set of calls, wherein the calls are discretized into time intervals by identifying the time intervals in which the respective calls took place;
   (c) perform aggregation of the discretized calls by site; and
   (d) evaluate a number of calls rated as poor within each site/time interval combination against a service level compliance requirement.

2. The non-transitory computer-readable medium of claim 1, wherein the aggregation of the discretized calls by site comprises grouping the discretized calls based on call endpoint subnet.

3. The non-transitory computer-readable medium of claim 1, wherein the one or more quality metrics of each call of the set of calls are evaluated against the threshold values.

4. The non-transitory computer-readable medium of claim 1, having further computer-executable instructions stored thereon that, when executed, cause a computer system to determine that a time interval within a longer time period is a non-compliant time interval, wherein the non-compliant time interval within the longer time period results in non-compliance for the longer time period.

5. The non-transitory computer-readable medium of claim 1, wherein the time intervals are hours.

6. A non-transitory computer-readable medium having computer-executable instructions stored thereon that, when executed, cause a computer system to:
    for a call with at least two endpoints each having a quality classification, classify the call based on the endpoint with the lowest quality classification;
    further classify the call based on geography;
    further classify the call based on infrastructure components; and
    present a dashboard configured to provide call quality information for the call.

7. The non-transitory computer-readable medium of claim 6, having further computer-executable instructions stored thereon that, when executed, cause a computer system to further classify the call based on federation.

8. The non-transitory computer-readable medium of claim 6, wherein the dashboard provides a filter selected from the group consisting of:
    a filter for geography hierarchy;
    a filter for call classification hierarchy;
    a filter for organization hierarchy,
    a filter for network hierarchy; and
    a filter for type of call.

9. A computing device comprising one or more processors and a storage medium having computer-executable instructions stored thereon that, when executed, cause the computing device to:
    implement a rule engine;
    using the rule engine, monitor a database for poor quality voice calls; and
    using the rule engine, trigger an outbound notification of a poor quality voice call in which an end user participated to be delivered to the end user via a channel in accordance with one or more rules that apply to a usage scenario of the poor quality voice call.

10. The computing device of claim 9, wherein presence information is used to determine the channel to use for delivering the notification.

11. The computing device of claim 10, wherein the presence information indicates that the end user is online and available.

12. The computing device of claim 11, the storage medium having further computer-executable instructions stored thereon that, when executed, cause the computing device to use an instant message to deliver the notification.

13. The computing device of claim 10, wherein the presence information indicates that the end user is offline or unavailable.

14. The computing device of claim 13, the storage medium having further computer-executable instructions stored thereon that, when executed, cause the computing device to use an e-mail to deliver the notification.

15. The computing device of claim 9, wherein the notification includes a link for providing feedback.

16. The computing device of claim 9, wherein the notification includes one or more possible causes of poor voice quality.

17. The computing device of claim 16, wherein the one or more possible causes of poor voice quality include at least one of poor wireless connectivity or an unsupported audio device.

18. The computing device of claim 9, wherein the database is a quality of experience (QoE) database.

19. A non-transitory computer-readable medium having computer-executable instructions stored thereon that, when executed, cause a computer system to:
    for a call with at least two endpoints each having a quality classification, assign an endpoint quality classification to the call based on the endpoint with the lowest quality classification;
    assign a further classification to the call based on one or more of geography, infrastructure components, and federation;
    group the call with one or more other calls having the same endpoint quality classification and the same further classification in a group of calls; and
    present a dashboard configured to provide voice quality information, the endpoint quality classification, and the further classification for the group of calls.

20. The non-transitory computer-readable medium of claim 19, wherein the dashboard is further configured to cause one or more reports on further details of the group of calls or individual calls in the group to be generated.

21. The non-transitory computer-readable medium of claim 19, wherein the dashboard provides a filter selected from the group consisting of:
    a filter for geography hierarchy;
    a filter for endpoint quality classification hierarchy;
    a filter for organization hierarchy;
    a filter for network hierarchy; and
    a filter for type of call.

22. A computer-implemented method comprising:
    for a call with at least two endpoints each having a quality classification, assigning an endpoint quality classification to the call based on the endpoint with the lowest quality classification;
    assigning a further classification to the call based on one or more of geography, infrastructure components, and federation;
    grouping the call with one or more other calls having the same endpoint quality classification and the same further classification in a group of calls; and
    presenting a dashboard configured to provide voice quality information, the endpoint quality classification, and the further classification for the group of calls.

23. The method of claim 22, further comprising generating one or more reports on further details of the group of calls or individual calls in the group.

24. The method of claim 22, wherein the dashboard provides a filter selected from the group consisting of:
    a filter for geography hierarchy;
    a filter for endpoint quality classification hierarchy;
    a filter for organization hierarchy; a filter for network hierarchy; and
    a filter for type of call.

* * * * *